United States Patent [19]

Watanabe

[11] Patent Number: 5,680,317
[45] Date of Patent: Oct. 21, 1997

[54] CAD DEVICE FOR METAL MOLD

[75] Inventor: Kotaro Watanabe, Nagoya, Japan

[73] Assignee: Mitsubishi Denki Kabushiki Kaisha, Tokyo, Japan

[21] Appl. No.: 442,754

[22] Filed: May 17, 1995

[30] Foreign Application Priority Data

May 19, 1994 [JP] Japan ................ 6-105506

[51] Int. Cl.⁶ .................................................. G06F 17/50
[52] U.S. Cl. ...................... 364/488; 364/474.24; 364/512
[58] Field of Search ........................... 364/488, 489, 364/490, 491, 512, 578, 474.01, 474.22, 474.23, 474.24, 476, 468.01, 468.04, 468.24, 472.01, 472.02; 395/500

[56] References Cited

U.S. PATENT DOCUMENTS

| 4,989,166 | 1/1991 | Akasaka et al. | 364/578 |
|---|---|---|---|
| 5,023,800 | 6/1991 | Carver et al. | 364/474.24 |
| 5,072,782 | 12/1991 | Namba et al. | 164/45 |
| 5,095,419 | 3/1992 | Seki et al. | 364/188 |
| 5,115,400 | 5/1992 | Watanabe et al. | 364/474.24 |
| 5,177,689 | 1/1993 | Kinasi et al. | 364/474.24 |
| 5,225,987 | 7/1993 | Thompson | 364/468 |
| 5,249,135 | 9/1993 | Fujita | 364/474.21 |
| 5,293,321 | 3/1994 | Fujita et al. | 364/474.26 |
| 5,297,022 | 3/1994 | Watanabe | 364/191 |
| 5,414,807 | 5/1995 | Seki et al. | 395/142 |
| 5,435,902 | 7/1995 | André, Sr. | 205/67 |
| 5,552,995 | 9/1996 | Sebastian | 364/468.03 |

FOREIGN PATENT DOCUMENTS 62-150468  7/1987  Japan.
62-200464  9/1987  Japan.

*Primary Examiner*—Kevin J. Teska
*Assistant Examiner*—Leigh Marie Garbowski
*Attorney, Agent, or Firm*—Sughrue,Mion,Zinn,Macpeak & Seas, PLLC

[57] ABSTRACT

The present invention relates to CAD device for designing molding pieces in addition to aiding mounting component parts or machining component part mounting holes for plural plates which are stacked to constitute a metal mold. The CAD device, which can prepare a drawing and generate NC data effectively, comprises software 4 stored in a main memory 3, a graphic defining command 4a, a plate setting command 4b, a component data base registering command 4c, a component mounting command 4d, a plate separating command 4e and an NC data generating command 4f. In accomplishing its goal, the CAD device makes each command available for the molding piece as well as the plates.

25 Claims, 29 Drawing Sheets

FIG.1

Plate Setting

1 : End / 2 : Interrupt / 3 : Print

| No. | Plate Name | State | Thickness | Distance | Material |
|---|---|---|---|---|---|
| 1 | Fixed Bottom Plate | Normal | 30 | 0 | S55C |
| 2 | Runner Stripper Plate | Absent | *** | *** | **** |
| 3 | Fixed Template | Hidden | 50 | 0 | S55C |
| 4 | Stripper Plate | Hidden | 20 | 0 | S55C |
| 5 | Moving Template | Hidden | 30 | 0 | S55C |
| 6 | Wear Plate | Hidden | 30 | 25 | S55C |
| 7 | Upper Ejector Plate | Hidden | 10 | 0 | S55C |
| 8 | Lower Ejector Plate | Hidden | 10 | 0 | S55C |
| 9 | Moving Bottom Plate | Hidden | 30 | 0 | S55C |
| 10 | 1st Spacer Block | Hidden | 45 | 0 | S55C |
| 11 | 2nd Spacer Block | Hidden | 45 | 0 | S55C |

Molding Piece Setting

1: End / 2: Interrupt / 3: Print

| No. | Molding Piece Name | State | Ref. Plate | Ref. Pl. Side | Upper Thickness | Lower Thickness | Material |
|---|---|---|---|---|---|---|---|
| 21 | 1st Cavity | Hidden | 3 | Back | 40 | 0 | NAK55 |
| 22 | 2nd Cavity | Hidden | 3 | Back | 40 | 0 | NAK55 |
| 23 | 1st Core | Hidden | 5 | Front | 50 | 20 | NAK55 |
| 24 | 2nd Core | Hidden | 5 | Front | 50 | 20 | NAK55 |

17   18              19      20    21      22     23     24

JUST AFTER SEPARATING PLATES

AFTER CHANGING KIND OF LINE OF PLATES

PARTED DRAWING/MOVING SIDE
(DRAWN WITH FIXED SIDE UPWARD)

PARTED DRAWING/FIXED SIDE
(DRAWN WITH MOVING SIDE UPWARD)

FIG.7

Plate Setting

1 : End / 2 : Interrupt / 3 : Print

| No. | Plate Name | State | Thickness | Distance | Material |
|---|---|---|---|---|---|
| 1 | Fixed Bottom Plate | Rev.&Hid. | 30 | 0 | S55C |
| 2 | Runner Stripper Plate | Rev.&Hid. | 20 | 0 | S55C |
| 3 | Fixed Template | Reverse | 50 | 0 | S55C |
| 4 | Stripper Plate | Absent | ** | ** | **** |
| 5 | Moving Template | Normal | 30 | 0 | S55C |
| 6 | Wear Plate | Hidden | 10 | 25 | S55C |
| 7 | Upper Ejector Plate | Hidden | 10 | 0 | S55C |
| 8 | Lower Ejector Plate | Hidden | 30 | 0 | S55C |
| 9 | Moving Bottom Plate | Hidden | 45 | 0 | S55C |
| 10 | 1st Spacer Block | Hidden | 45 | 0 | S55C |
| 11 | 2nd Spacer Block | | | | |

FIG.8d

| Machining Condition Setting ||||
|---|---|---|---|
| Material | Tool Diameter | Rotational Speed | Feed Speed |
| S55C | 10 | 120 | 12.5 |
| S55C | 20 | 110 | 10.5 |
| S55C | 30 | 100 | 9.5 |
| ⋮ | ⋮ | ⋮ | ⋮ |
| SKD11 | 10 | 100 | 12.5 |
| SKD11 | 20 | 80 | 10.0 |
| SKD11 | 30 | 75 | 9.5 |
| ⋮ | ⋮ | ⋮ | ⋮ |
| NAK55 | 10 | 80 | 10.5 |
| NAK55 | 20 | 75 | 9.5 |
| NAK55 | 30 | 70 | 8.5 |
| ⋮ | ⋮ | ⋮ | ⋮ |
| 25 | 26 | 27 | 28 |

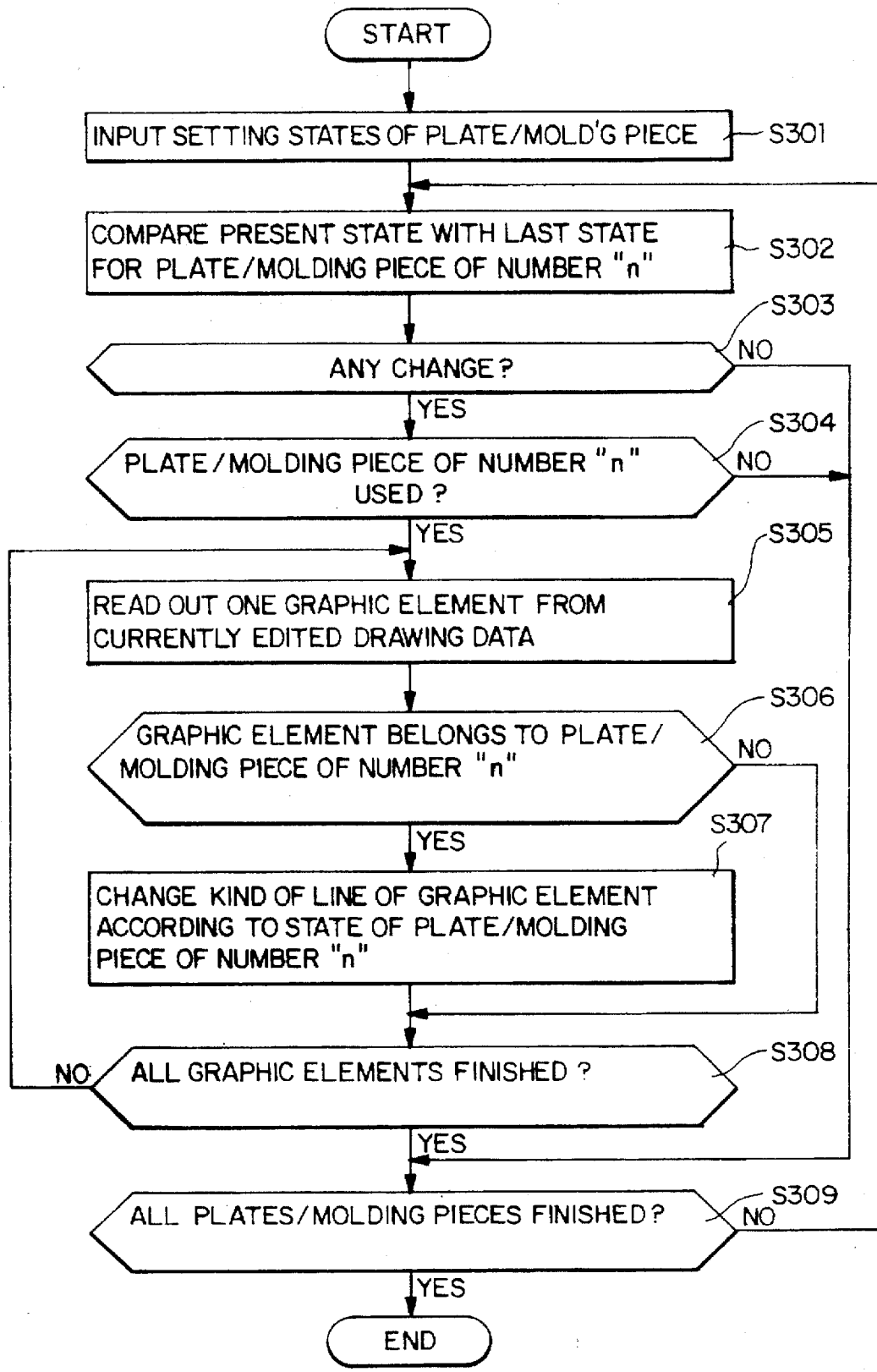

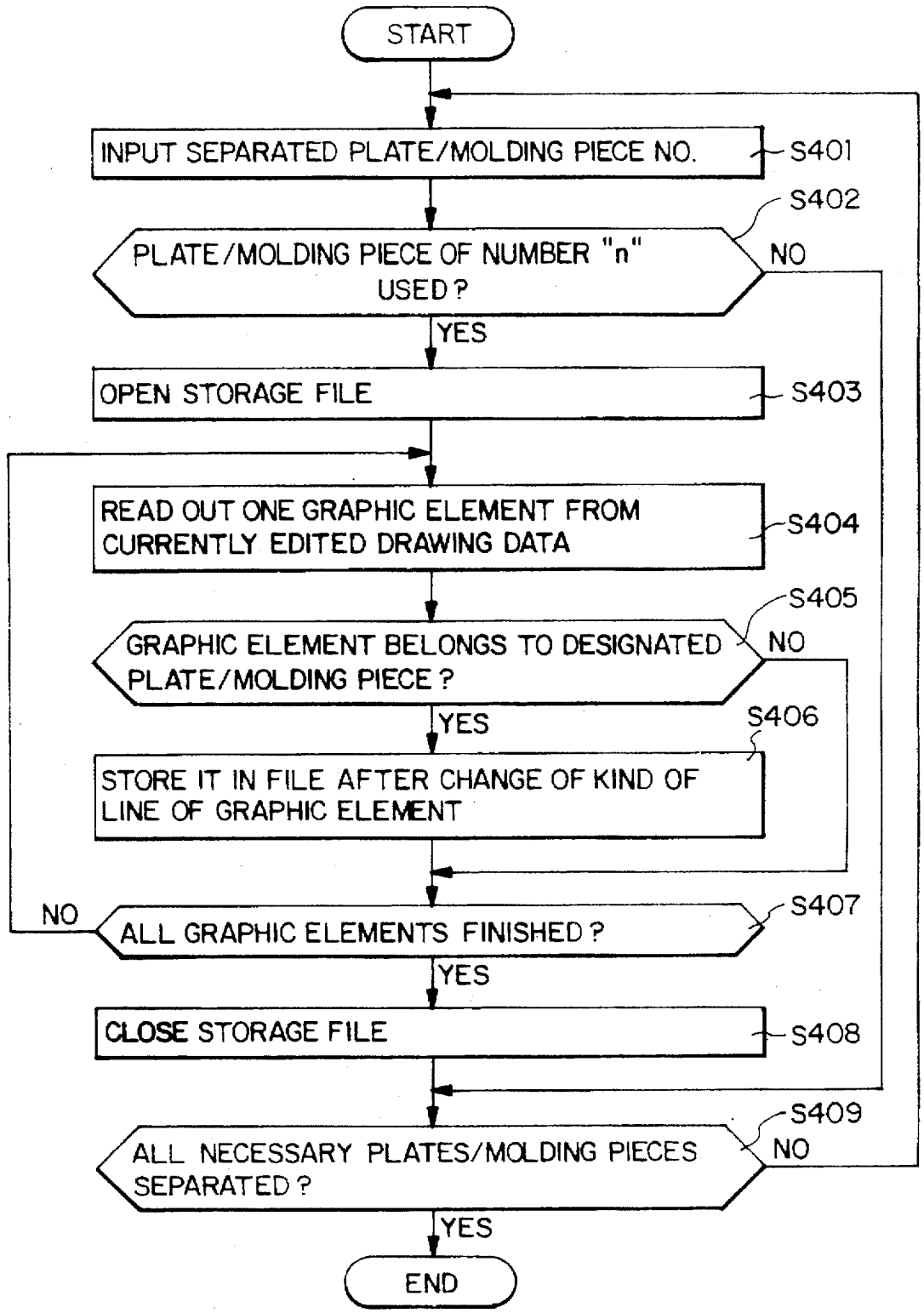

FIG.12a
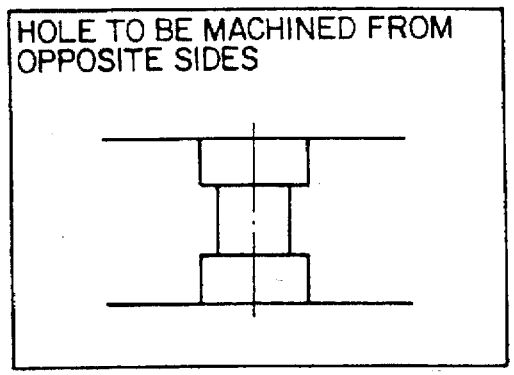
HOLE TO BE MACHINED FROM OPPOSITE SIDES
↓ SEPARATE
FIG.12b
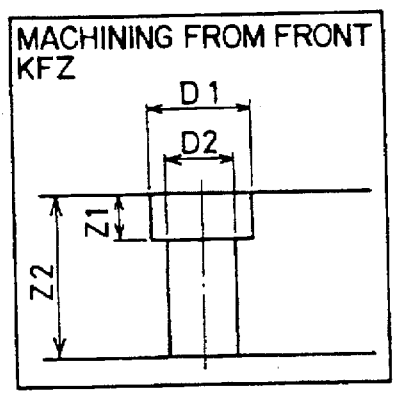
MACHINING FROM FRONT KFZ
FIG.12c
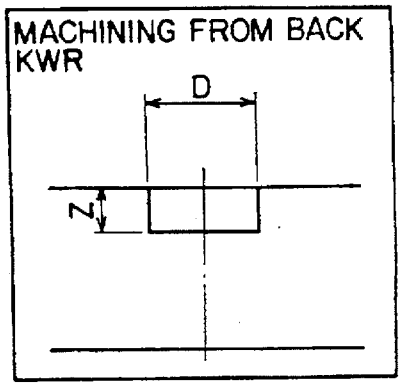
MACHINING FROM BACK KWR
↓ REGISTER
FIG.12d
| PLATE | FRONT HOLE SHAPE | BACK HOLE SHAPE |
|---|---|---|
| | COMBINED HOLE SHAPE REG. | |
| | 1:END/2:INTERRUPT/3:PRINT | |
| 1ST | KFZ | KWR |
| 2ND | | |
| 3RD | | |
| 4TH | | |
| 5TH | | |
| 6TH | | |
| ⋮ | 51 | 52 |

COMBINE

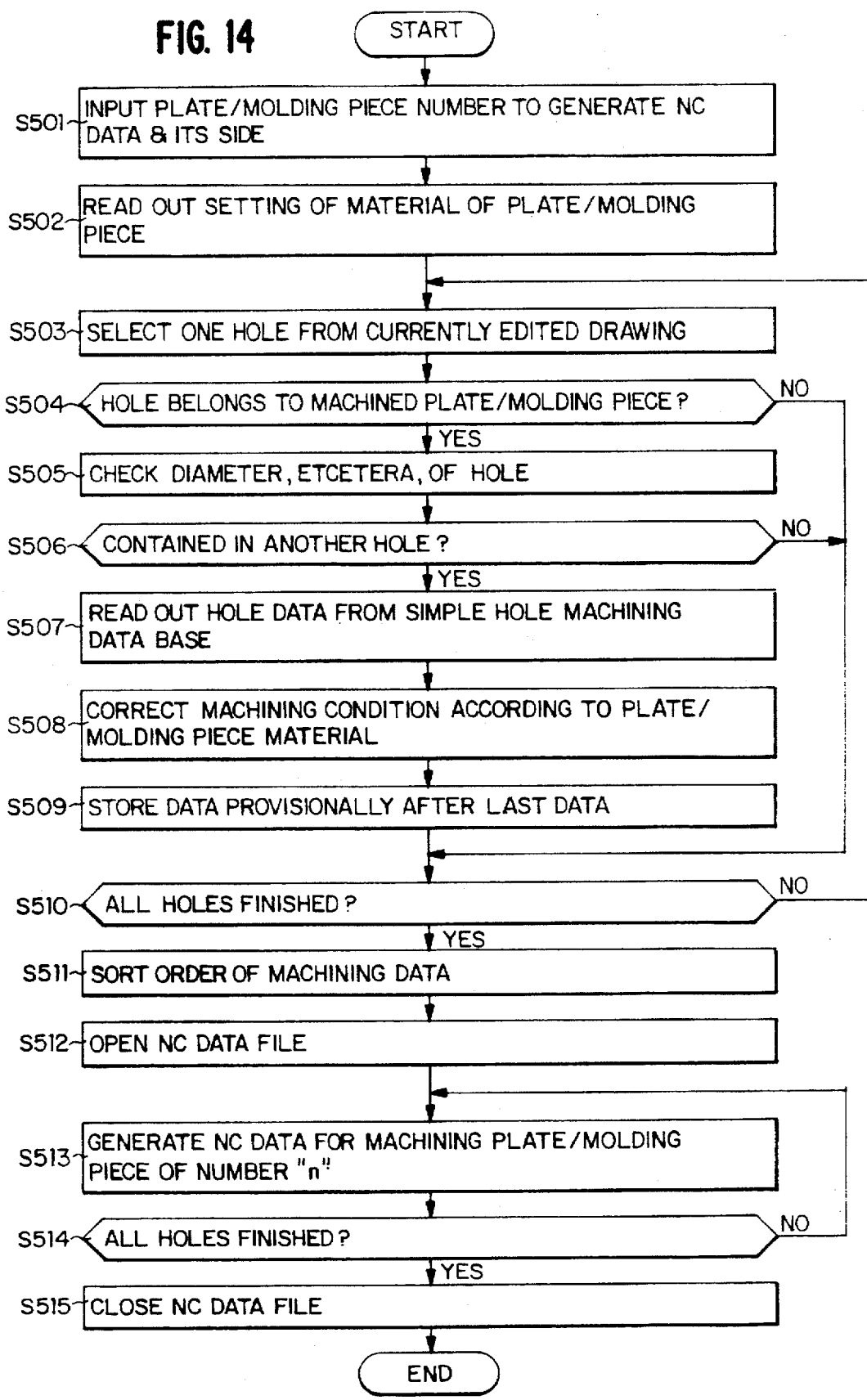

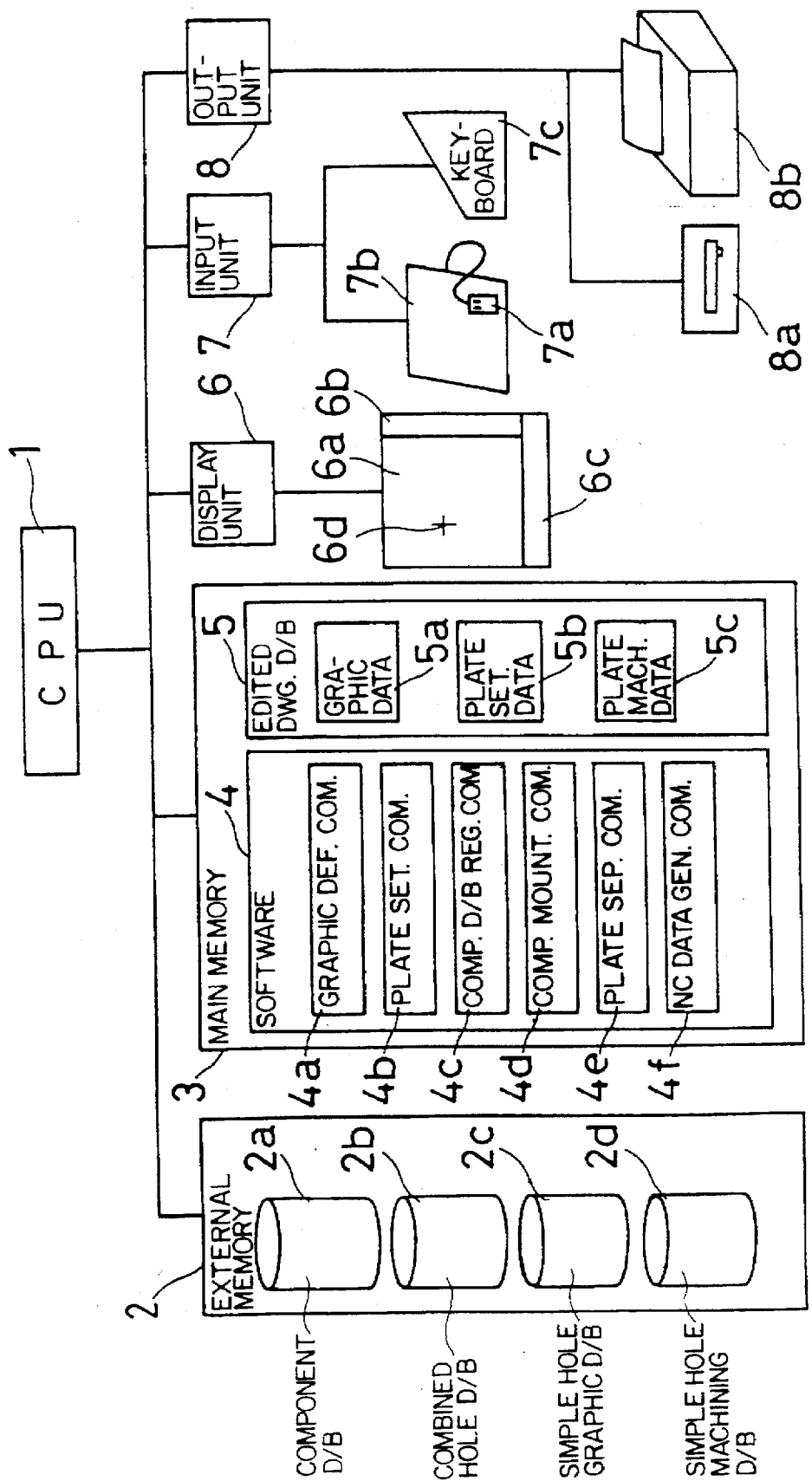

FIG.23

● Set plate

PLATE SETTING

| NO. | NAME | THICK-NESS | DIST-ANCE |
|---|---|---|---|
| 1 | FIXED BOTTOM PLATE | 40 | 0 |
| 2 | RUNNER STRIPPER PLATE | 0 | 0 |
| 3 | FIXED TEMPLATE | 30 | 0 |
| 4 | STRIPPER PLATE | 0 | 0 |
| 5 | MOVING TEMPLATE | 30 | 0 |
| 6 | WEAR PLATE | 30 | 30 |
| 7 | UPPER EJECTOR PLATE | 10 | 0 |
| 8 | LOWER EJECTOR PLATE | 10 | 0 |
| 9 | MOVING BOTTOM PLATE | 40 | 0 |
| 10 | 1ST SPACER BLOCK | 30 | 0 |
| 11 | 2ND SPACER BLOCK | 30 | 0 |

CAD DEVICE FOR METAL MOLD

BACKGROUND OF THE INVENTION

1. Field of the Invention

The present invention relates to a computer aided design (CAD) device and a computer aided manufacture (CAM) device for metal molds, particularly to a CAD/CAM device that helps to mount component parts and machine component part mounting holes for a metal mold which is composed of stacked plates and molding pieces, such as a metal molding die or a multi-stage press die.

2. Description of Background Art

FIG. 15 is a block diagram illustrating an entire structure of a conventional CAD/CAM device for metal molds.

A hardware structure is mainly composed of a central processing unit (CPU) 1, an external memory 2, a main memory 3, a display unit 6, an input unit 7 and an output unit 8. The external memory 2 stores a component data base 2a (data base may be mentioned as D/B in the figure), a combined hole data base 2b, a simple hole graphic data base 2c and a simple hole machining data base 2d. The main memory 3 stores a software 4 and an edited drawing data base 5. The software 4 has a plurality of commands, e.g. a graphic defining command 4a, a plate setting command 4b, a component data base registering command 4c, a component mounting command 4d, a plate separating command 4e, a numerical control (NC) data generating command 4f. The edited drawing data base 5 stores graphic data 5a, plate setting data 5b and plate machining data 5c. A display unit 6 is a CRT display which has a graphic display area 6a, a command selection area 6b and a message display area 6c, and a mouse cursor 6d on a screen. The input unit 7 is composed of a mouse 7a, a tablet 7b and a keyboard 7c. The output unit 8 is composed of a floppy disk drive unit 8a and a plotter 8b.

Its operation will be described hereunder. The following description takes an injection molding die as an example of a metal mold.

First, registration for each data base in the external memory 2 is described.

Registration of the component data base 2a is a data base updating work that is performed when new components become necessary. The component data base 2a stores graphic data of a mold base and component parts of the metal mold, e.g. pins or bushes, which have been registered therein. In case mounting holes are provided on the mold base for fitting the component parts, the combined hole data base 2b has combined holes correspond to the component parts of the component data base 2a, respectively. This combined hole is registered, as a combination of simple holes, for each plate of the metal mold. The simple hole graphic data base 2c stores shape data of each simple hole. The simple hole machining data base 2d registers machining data that represent how to machine each simple hole. The machining data are composed of a machining process, e.g. centering drilling prepared hole drilling tapping, and a working condition such as a spindle speed or a feed speed. An operator can register data in each data base of the external memory 2 by use of the component data base registering command 4c.

FIG. 16 illustrates a concept of each data base in the external memory 2.

As shown in the component data base 2a and the combined hole data base 2b, a mounting hole for a component part, e.g. an ejector pin is made by combining three kinds of simple holes KEG, KDN and KCX. The notation "4-back-KEG" means that a simple hole named "KEG" is attached to a 4th plate from its back side. The simple hole machining data base 2d registers a way of machining each simple hole KDN, KEG, KCX of the simple hole graphic data base 2c. For instance, it registers that the simple hole KCX is processed in order of, "centering drilling spot facing beveling". As mentioned above, the component data base 2a, the combined hole data base 2b, the simple hole graphic data base 2c and the simple hole machining data base 2d are registered in a related manner to each other.

FIGS. 17 to 20 show screens respectively in which each component of the component data base 2a is being set. FIG. 17 shows a screen in which the component parts are being registered. FIG. 18 shows a screen in which the combined holes are being registered. FIG. 19 shows a screen in which shapes of the simple holes are being registered.

FIG. 20 shows a screen in which a way of machining the simple hole is being registered.

A process of preparing a drawing for a metal mold is described referring to a flowchart of FIG. 21.

First, in a step S101, as a mold base calling operation, an operator calls a mold base from the component data base 2a through the component mounting command 4d. If he or she operates the mouse 7a to move the mouse cursor 6d at a position of the component mounting command 4d in the command selection area 6b and pushes a button of the mouse 7a, the component mounting command 4d is activated. The operator inputs a component name and a normal dimension by the keyboard 7c. When the mouse cursor 6d is placed at a mounting position of the mold base and the button is pressed, the mold base is inserted at that position.

FIG. 22 shows a screen in which the mold base has been inserted. The mold base according to this drawing data has a structure of stacked plates. Then, proceeding to a step S102, as a plate setting operation, a thickness, a material and the like of the plates are set through the plate setting command 4b. When the command is selected, a setting table is displayed on the screen. The operator positions the mouse cursor 6d at a desired item to be set and inputs a numerical value therein through the keyboard 7c. Finally, if the operator chooses an "end" menu, the plate setting command 4b is finished. FIG. 23 shows a screen in which contents of the table are going through setting operations.

Then, proceeding to a step S103, as a component mounting operation, the operator selects a mounted component through the component mounting command 4d and mounts it on the mold base. An operation therefor is the same as that of the step S101. Proceeding to a step S104, as a component part mounting hole position defining operation, the operator defines a position of the mounting hole, since the mounting hole is defined in the component data base 2a. The position of the mounting hole is defined by inputting a coordinate of a set position of the mounting hole through the keyboard 7c or specifying the position through the mouse 7a. In case the same components are provided on several positions, the coordinate specifying operation is repeated.

FIG. 24 shows a screen in which one component part and mounting holes are defined. With the above structure of component data base, the mounting holes are defined respectively for a plurality of plates. In a next step S105, it is decided if all the components have been finished or not. If there are additional components to be mounted, execution returns to the step S103, and the same operations are repeated. When finishing mounting all the components, execution proceeds to a next step S106.

In the step S106, as a metal mold drawing finishing operation, the operator adds necessary data, e.g. comments or dimensions, through the graphic defining command 4a, to finish a drawing of the metal mold. The graphic then prepared is defined by specifying which plate it belongs to. Proceeding to a step S107, as a metal mold drawing output operation, the operator stores the finished metal mold drawing as a drawing file into the external memory 2 or a floppy disk in the floppy disk drive unit 8a. Otherwise, it is outputted as a drawing by the plotter 8b. FIG. 25 shows a screen that displays a finished metal mold drawing.

A process for preparing a drawing of each plate and generating NC data is described referring to a step S108 and so on shown in FIG. 21.

In the step S108, as a separating operation of a drawing of a plate of a number "n", the operator separates the plate drawing one by one from the drawing of the metal mold through the plate separating command 4e. At this time, it is enough for the operator to specify the plate to be separated. In the drawing of the metal mold, a graphic of the mold base is defined as a stacked structure of the plates, so that only a graphic of the specified plate is left. Since drawing data of the components do not belong to any plate in itself, they are deleted. The component part mounting holes are left while being separated into simple holes of each plate. FIG. 26 shows a state in which one separated plate drawing is displayed on the screen. Proceeding to a step S109, the operator finishes the plate drawing. In the step S108, a separated plate may be the one which is hidden under another plate. In the metal mold drawing, the line that should be solid may be remained broken. Therefore, it is necessary to finish the drawing by changing the kind of lines or writing other comments and dimensions therein. These operations are executed by the graphic defining command 4a. Proceeding to a step S110, as a finished drawing output operation, a finished plate drawing is outputted.

A step S111 executes an NC data generating operation for machining the front side of the plate. A step S112 executes an NC data generating operation for machining the back side of the plate. The operator makes up the NC data for drilling, regarding the plate drawing, through the NC data generating command 4f. The NC data are to be generated twice if the plate should be machined both from the front and back sides. The operator designates on which plate side the NC data are to be prepared, the front side or back side, in executing the NC data generating command 4f. FIG. 27 shows a screen in which the NC data for machining the front side of the plate is being generated. At this time, the machining process is being simulated on the screen. FIG. 28 shows a screen in which the NC data for machining the back side of the plate is being generated. Proceeding to a step S113, it is decided if all the plates are complete. If there is any plate to be processed, execution returns to the step S108 and the same steps are repeated. If the NC data for machining all the plates are finished generating, the operations are ended.

Here, as described above, the conventional CAD device for the metal mold is capable of preparing a drawing for each plate as a component of the metal mold and generating NC data. However, this device takes no particular account of a so-called molding piece (also called an insert) than for other parts of the plates, such as a cavity, a core or a slider. These molding pieces are component parts of the metal mold in themselves, and should be machined with mounting holes for the other associated component parts. Accordingly, it is very troublesome to deal with the molding piece by the conventional CAD device.

Moreover, an additional work is caused to correct the kind of lines of the hole shapes in finishing the plate drawing, after the plates have been separated from each other. However, this work is very complicated, because the operator must make decision for each circle of each hole whether it should be solid or broken.

Furthermore, in case of separating the metal mold into a moving side and a fixed side to carry out the design effort in a state of a separated drawing, it is not clearly defined which side is the front or the back of the plate. Thus, when there arises a need to correct the kind of outlines of the holes, it is necessary to decide which circle of which hole should be corrected into a solid line or a broken line. Such a work takes much labor.

Moreover, there are many kinds of plate formations used in the structure of the metal mold, and the kind selected depends on the design of the metal mold. Some of the plates will become unnecessary according to the metal mold structure in some cases. However, it is impossible to omit the specifying operation in setting the plates. As a result, unnecessary mounting holes often are generated due to the non-existent plate.

In addition, it is impossible to change data of a machining condition that are registered in the component data base even if a material of the plate is changed. Consequently, it is impossible to set an appropriate machining condition for the material of each plate.

Moreover, simple holes are attached only to one side (the front side or the back side) of one plate, in registering the component part mounting holes in the component data base. It is impossible to register such a hole as may need to be machined from both the front and back sides. Accordingly, it is very laborious to machine such a hole.

Furthermore, in case of a mounting hole for components, e.g. a bush and a pin, that have different way of combinations, namely, that are used in combination in one case and separately in another case. Such a mounting hole should be registered as a combined component. Thus, there is a problem that the number of registered components enlarges, thereby increasing labor.

SUMMARY OF THE INVENTION

This invention has been made to solve the above problems, and it is an object of the invention to provide a CAD device that is capable of dealing with molding pieces such as a cavity, a core and a slider, in the same manner as other plates, thereby effectively preparing drawings and generating NC data.

It is another object of the invention to provide a CAD device that has a function to change kinds of lines of holes after separating plates from each other, thereby eliminating the effort for changing kinds of lines.

It is still another object of the invention to provide a CAD device that decides and specifies if the front side of each plate is a moving side or a fixed side, in case of designing a metal mold in a parted drawing, thereby eliminating the effort for changing kinds of lines of holes.

It is still another object of the invention to provide a CAD device that requires only inputting necessary plates and setting an unnecessary plate in a "out of use" state, according to a structure of a designing metal mold, there by avoiding unnecessary mounting holes from being generated.

It is still another object of the invention to provide a CAD device that changes a machining condition of mounting holes from a standard condition, according to a material of a plate and a molding piece, by inputting the material, thereby properly coping with the change of the material of the plate.

It is still another object of the invention to provide a CAD device that is capable of registering a component part mounting hole which is machined from both front and back sides of a plate, in registering the mounting hole, thereby treating such a hole in the same manner as a hole which is machined from one side.

It is still another object of the invention to provide a CAD device that, if there are two or more holes defined on the same coordinate, omits generation of NC data for a smaller hole in generating NC data, thereby making it possible to define a hole for combined components only by registering the component parts individually in a component data base, regardless of a way of combination of the component parts.

In order to achieve the above objects, a CAD device for a metal mold in accordance with the present invention is provided with comprises several basic features including: a graphic defining means for designating to which a graphic to be prepared belongs among plates and molding pieces that are plurally piled up to form the metal mold, and adding necessary data thereto and representing it on a drawing of the metal mold; an input condition setting means for setting a predetermined condition including mutual data in the plates and the molding pieces; a component data base registering means for registering graphic data of component parts mounted on the metal mold and machining data of mounting holes; a component mounting means for designating a mounting position of the component part on the drawing of the metal mold; and a separated drawing preparing means for separating a finished drawing of the metal mold into each plate and each molding piece and preparing a drawing of the plate and a drawing of the molding piece.

In a CAD device according to the present invention, in addition to the above basic features, the input condition setting means is capable of setting each of the plates and the molding pieces, as the mutual data, if it is disposed uppermost or hidden by the other plate or the molding piece, and changes a displayed state, that is shown by a solid line or a broken line, of each mounting hole, which is defined and exists on the plate or the molding piece, in accordance with a change of setting, or prepares a graphic of a newly defined mounting hole in accordance with the setting.

In a CAD device according to the present invention, in addition to the above basic features, the input condition setting means is capable of setting each of the plates and the molding pieces, as the mutual data, if it is disposed with a fixed side upward or a moving side upward, and changes a displayed state, that is shown by a solid line or a broken line, of each mounting hole, which is defined and exists on the plate or the molding piece, in accordance with a change of setting, or prepares a graphic of a newly defined mounting hole in accordance with the setting.

In a CAD device according to the present invention, in addition to the above basic features, the input condition setting means is capable of setting a plate or a molding piece that is omitted according to a structure of the metal mold as out-of-use and the component mounting means is prohibited from defining the mounting hole on the plate or the molding piece that is set into out-of-use.

A CAD device according to the present invention, in addition to the above basic features, the input condition setting means is capable of setting materials of the plates and the molding pieces, and the component mounting means changes a machining condition of the mounting hole in accordance with the set materials of the plates and the molding pieces.

In a CAD device according to the present invention, in addition to the above basic features, the component data base registering means registers a combined hole as the mounting hole of the component part for a plurality of plates or molding pieces by combining a plurality of simple hole shapes, the simple hole shape being data registering shapes and machining of a hole for one plate or molding piece, and the component data base registering means is capable of simultaneously registering a front side and a back side of the combined hole when it is necessary to machine the one plate or molding piece from the front side and the back side.

A CAD device also comprises, in addition to the above basic features, an NC data generating means for selecting a hole of a largest hole diameter and generating NC data for a hole machining when two or more mounting holes are defined for mounting two or more component parts at a same coordinate.

In the CAD device according to the present invention, the graphic defining means designates to which a graphic to be prepared belongs among plates and molding pieces that are plurally piled up to form the metal mold, and adds necessary data thereto and represents it on a drawing of the metal mold. The input condition setting means sets a predetermined condition including mutual data in the plates and the molding pieces. The component data base registering means registers graphic data of component parts mounted on the metal mold and machining data of mounting holes, as desired. The component mounting means designates a mounting position of the component part on the drawing of the metal mold. The separated drawing preparing means separates a finished drawing of the metal mold into each plate and each molding piece and prepares a drawing of the plate and a drawing of the molding piece. Thus, drawings are prepared for the molding piece in addition to the plates that constitute the metal mold, by the same process of operations.

In the input condition setting means of the CAD device, in addition to the above functions, it is possible to set each of the plates and the molding pieces if it is disposed uppermost or hidden by the others. The displayed state of each hole which is defined and exists on the plate or the molding piece is changed in accordance with the change of setting. A graphic of a newly defined mounting hole is prepared in accordance with the setting.

In the input condition setting means of the CAD device, in addition to the above functions, it is possible to set each of the plates and the molding pieces while making clear a direction of the fixed side and the moving side in the metal mold drawing. A displayed state of each hole which is defined and exists on the plate or the molding piece is changed in accordance with the change of setting. A graphic of a newly defined mounting hole is prepared in accordance with the setting.

In the input condition setting means and the component mounting means of the CAD device, in addition to the above functions, the input condition setting means is capable of setting a plate or a molding piece that is omitted according to a structure of the metal mold as out-of-use. The component mounting means is capable of preventing defining the component part mounting hole on the plate or the molding piece that is set into out-of-use.

In the input condition setting means and the component mounting means of the CAD device, in addition to the above functions, the input condition setting means is capable of setting materials of the plates and the molding pieces, and the component mounting means changes a machining condition of the component part mounting hole in accordance with the set materials of the plates and the molding pieces.

In the component data base registering means of the CAD device, in addition to the above functions, the front side and the back side of the combined hole is simultaneously registered, in case it is necessary to machine the one plate or molding piece from the front side and the back side when the combined hole is registered, as the mounting hole of the component part for a plurality of plates or molding pieces, by combining a plurality of simple hole shapes for one plate or molding piece.

In the CAD/CAM device, in addition to the above functions, the NC data generating means selects a hole of a largest hole diameter and generates NC data for a hole machining when two or more mounting holes are defined at the same coordinate.

BRIEF DESCRIPTION OF THE DRAWINGS

FIG. 1 is an explanatory drawing showing a plate setting of one embodiment of an inventive CAD device for metal molds.

FIG. 2 is an explanatory drawing showing a molding piece setting of one embodiment of an inventive CAD device for metal molds.

FIG. 7 is an explanatory drawing showing a plate setting in case of the parted drawing in one embodiment of an inventive CAD device for metal molds.

FIG. 8d is an illustration of machining condition table with settings for the structure of FIGS. 8a–8c.

FIG. 10 is a flowchart showing an internal processing of a plate state change in one embodiment of an inventive CAD device for metal molds.

FIG. 11 is a flowchart showing an internal processing of a plate separation and storage in one embodiment of an inventive CAD device for metal molds.

FIGS. 12a–12d are explanatory drawings showing holes machined both from the front and the back in one embodiment of a CAD device for metal molds.

FIG. 14 is a flowchart showing an internal processing of an NC data generation in one embodiment of an inventive CAD device for metal molds.

FIG. 15 is a block diagram illustrating an entire structure of one embodiment of a conventional and an inventive CAD device for metal molds.

FIG. 23 is an explanatory drawing showing a screen for a plate setting in the conventional CAD device for metal molds.

DETAILED DESCRIPTION OF PREFERRED EMBODIMENTS

The present invention will be described hereunder based upon specific embodiments.

Figure 3:
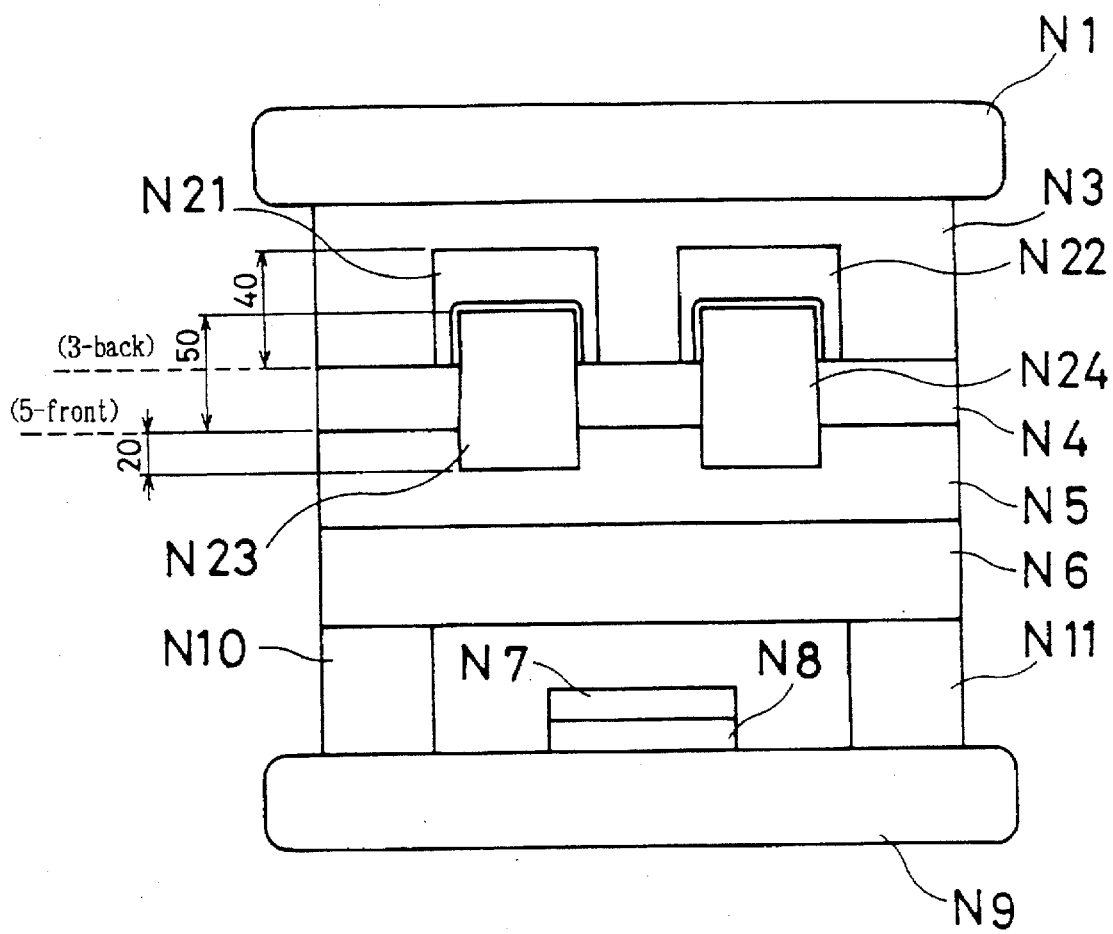
FIG. 3 is a front view showing a mold base drawing in one embodiment of an inventive CAD device for metal molds.

FIG. 1, FIG. 2, and FIG. 3 are display screens for which one embodiment of an inventive CAD device is used, and each of which shows a plate setting, a molding piece setting and a mold base drawing. Description for each condition of the display screen of a plate setting and a molding piece setting will be made whenever necessary. Since a basic structure of the embodiment of the device is the same in appearance as the above mentioned conventional device, its detailed description will be omitted referring to FIG. 15 which shows the entire structure. Moreover, reference numerals in FIG. 3 are made corresponding to each plate number or each mold piece number in the plate setting of FIG. 1 and the molding piece setting of FIG. 2. For example, a bottom plate of a fixed side (plate no. 1) is designated as N1, a first cavity (mold piece no. 21) as N21, thereby showing which member corresponds to which plate or molding piece.

An operation of the inventive CAD device according to one embodiment is described hereunder referring to FIGS. 1 to 14.

Figure 4:
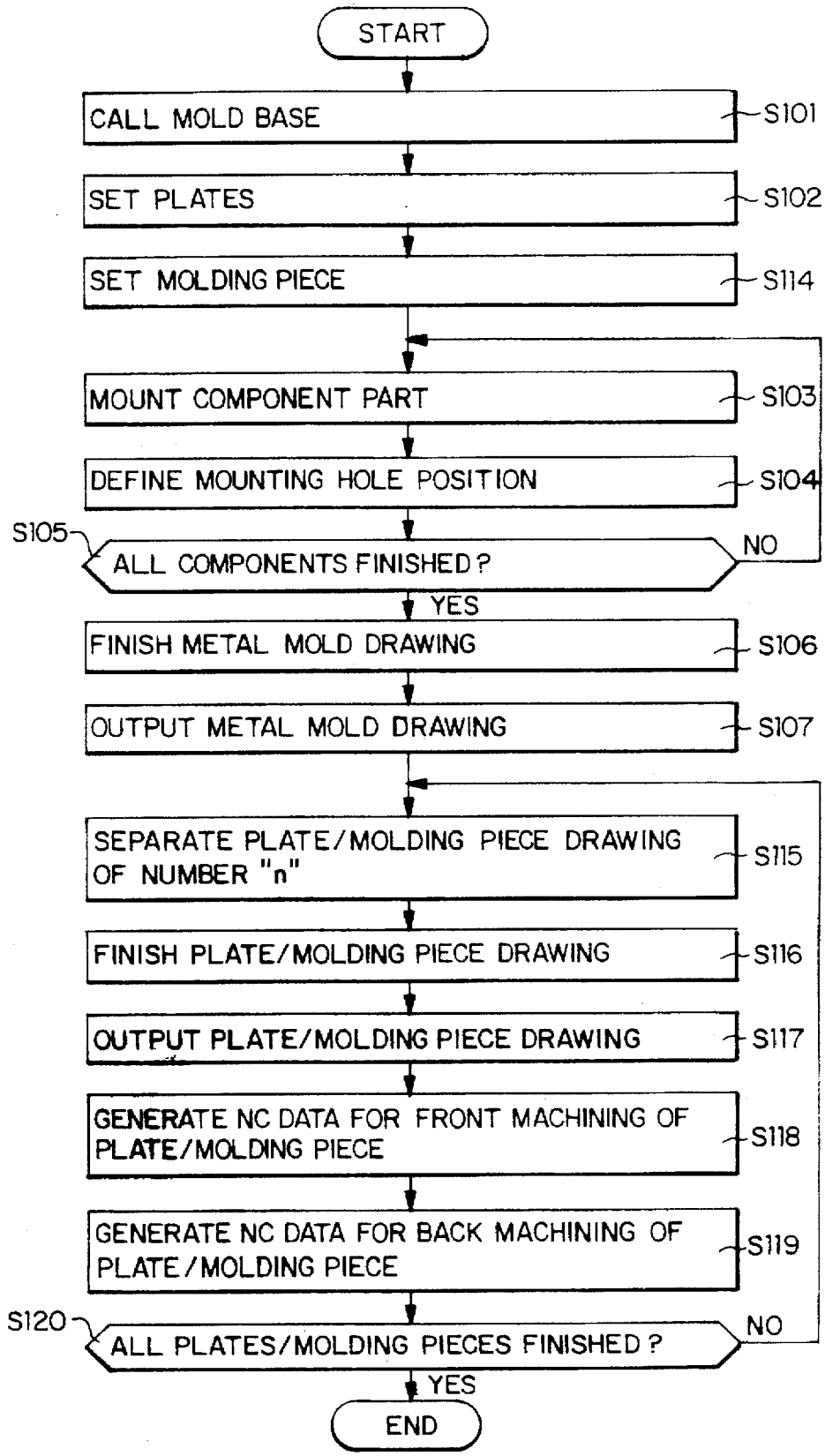
FIG. 4 is a flowchart showing procedures of a metal mold designing in one embodiment of an inventive CAD device for metal molds.
Figure 18:
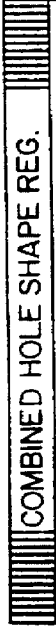
FIG. 18 is an explanatory drawing showing a screen for registering combined holes of the component data base of the conventional CAD device for metal molds.
Figure 19:
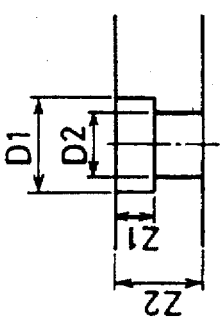
FIG. 19 is an explanatory drawing showing a screen for registering simple hole shapes of the component data base of the conventional CAD device for metal molds.
Figure 20:
FIG. 20 is an explanatory drawing showing a screen for registering simple hole machining of the component data base of the conventional CAD device for metal molds.

FIG. 4 is a flowchart showing procedures for preparing a metal mold drawing that is used in one embodiment of the inventive CAD device. This process of operations is basically the same as the conventional flowchart shown in FIG. 18. However, it is different in that it can deal with the molding pieces such as a core, a cavity and a slider, in addition to the plates, as component parts of the metal mold. In FIG. 4, the steps that carry out the same operation as FIG. 18 are given the same step numbers to simplify their descriptions.

Referring to FIG. 4, first, in a step S101, as a mold base calling operation, an operator calls a mold base from the component data base 2a through the component mounting command 4d. Then, proceeding to a step S102 that constitutes an input condition setting means, as a plate setting operation, conditions such as a thickness, a material and the like are set for each plate through the plate setting command 4b. The plate setting screen of FIG. 1 includes, as input items, a plate number setting area 11, a plate name setting area 12 in which the plate name is specified corresponding to the plate number, a plate state setting area 13, a plate thickness setting area 14, a plate distance setting area 15 in which a distance between one plate and another plate laid over the one plate is defined, and a plate material setting area 16. Among these areas, the input items in the plate state setting area 13 are not included in the conventional CAD device and will be described later in detail. In this embodiment, the plate number setting area 11 shows a lay-out according to which ten plates of nos. 1 to 11 are stacked on each other, though No.2 is set into out-of-use among them. For example, it shows that the plate no. 3 is a fixed template, has a thickness of 50 mm, and is made of a material S55C. The vertical order in the plate setting table represents an order in which the component parts are vertically stacked on each other. Namely, it shows that a fixed bottom plate of the plate no. 1 is laid over the fixed template of the plate no. 3 while a stripper plate of the plate no. 4 is disposed under the plate no 3.

Proceeding to a step S114 that constitutes an input condition setting means, as a molding piece setting operation, the operator sets input items, e.g., a thickness and a material, of the molding pieces through the plate setting command 4b, as of the plates. The molding piece setting screen of FIG. 2 includes, as inputted items, a molding piece number setting area 17, a molding piece name setting area that specifies names of molding pieces corresponding to the molding piece numbers, a molding piece state setting area 19 (the molding piece state is described later), a molding piece reference plane setting area 20 that specifies the plate number defining a reference plane for each molding piece, a molding piece reference plane side setting area 21 that specifies if the reference plane is the front or the back of the plate, a molding piece upper thickness setting area 22 that specifies a thickness of an upper part of the molding piece from the reference plane, a molding piece lower thickness setting area 23 that specifies a thickness of a lower part of the molding piece from the reference plane, and a molding piece material setting area 24. Here, the conventional device has no procedures for setting the molding pieces such as cavities, cores and sliders, which are not only component parts mounted on the plates, but also should be machined with mounting holes for other component parts, though they are mounted on the plates. Therefore, additional works are necessary to machine the molding pieces. However, the inventive CAD device can set the molding pieces in a stream of procedures as in the case of the plate setting. For example, with respect to the 1st cavity N21 (the molding piece no. 21), the back surface of the fixed template of the plate no. 3 is the reference plane (3-reverse), the upper thickness is 40 mm from this reference plane, and the material is NAK55. FIG. 3 shows a positional relationship of each plate and each molding piece. Registering as above, it is possible for the software to correctly determine the positional relationship of the plates and the molding pieces. At this time, an input error check is carried out so that the plate numbers are not overlapped with the molding piece numbers, like the plate numbers with each other. Thus, the plate setting and the molding piece setting are carried out both through the plate setting command 4b, and stored in the plate setting data 5b of the edited drawing data base 5.

Next, the procedures of steps S103 and S104 that constitute a component providing means are executed. In the step S103, as component part mounting operation, the operator selects a mounted component part through the component mounting command 4d and mounts it on the mold base. An operation therefor is the same as that of the step S101. Proceeding to a step S104, as a component part mounting hole position defining operation, the operator defines a position of the mounting hole, since the mounting hole of the component part is defined in the component data base 2a. The position of the mounting hole is defined by inputting a coordinate for setting the mounting hole through the keyboard 7c or specifying the position through the mouse 7a. In case the same component is provided on several positions, the coordinate specifying operation is repeated. With the above structure of component data base, the mounting holes are defined respectively for a plurality of plates and molding pieces. At this time, if new mounting holes are generated on the plate or the molding piece, they are registered in the plate machining data area 5c of the edited drawing data base 5. Proceeding to a next step S105, it is decided if all the components are finished or not. If there are additional components, execution returns to the step S103, and the same operations are repeated. When finishing mounting all the components, execution proceeds to a next step S106.

In the step S106, as metal mold drawing finishing operation, the operator adds necessary data, e.g. comments or dimensions, through the graphic defining command 4a, to finish a drawing of the metal mold. The graphic prepared at this time is defined by specifying the plate or the molding piece which it belongs to. Proceeding to a step S107, as a metal mold drawing output operation, the operator stores the finished metal mold drawing as a drawing file into the external memory 2 or a floppy disk in the floppy disk drive unit 8a. Otherwise, it is outputted in a form of a hard copy by the plotter 8b.

Next, proceeding to a step S115 that constitutes a separated drawing preparing means, as a separating operation of a plate drawing/molding piece drawing of a number "n", the operator separates the plate drawing or the molding piece drawing one by one from the drawing of the metal mold through the plate separating command 4e. At this time, it is enough for the operator to specify the plate or the molding piece to be separated. In the drawing of the metal mold, the graphic of the mold base is defined as a stacked structure of each plate and each molding piece, so that only a graphic which belongs to the specified plate or molding piece is left. Since drawing data of the component parts do not belong to any plate or any molding piece in itself, they are deleted. The component part mounting holes are left while being separated into simple holes for each plate or molding piece. Proceeding to a step S116 that constitute a graphic defining means, the operator finishes the plate drawings and the molding piece drawings. In the step 115, a separated plate or molding piece may be the one which is laid under another plate or molding piece in the metal mold drawing. In this case, the line that should be solid may remain broken.

Therefore, it is necessary to finish the drawing by changing the kind of lines or writing other comments and dimensions therein. These operations are executed by the graphic defining command 4a. Proceeding to a step S117, as a plate drawing/molding piece drawing output operation, a finished plate drawing or a molding piece drawing is outputted.

Figure 21:
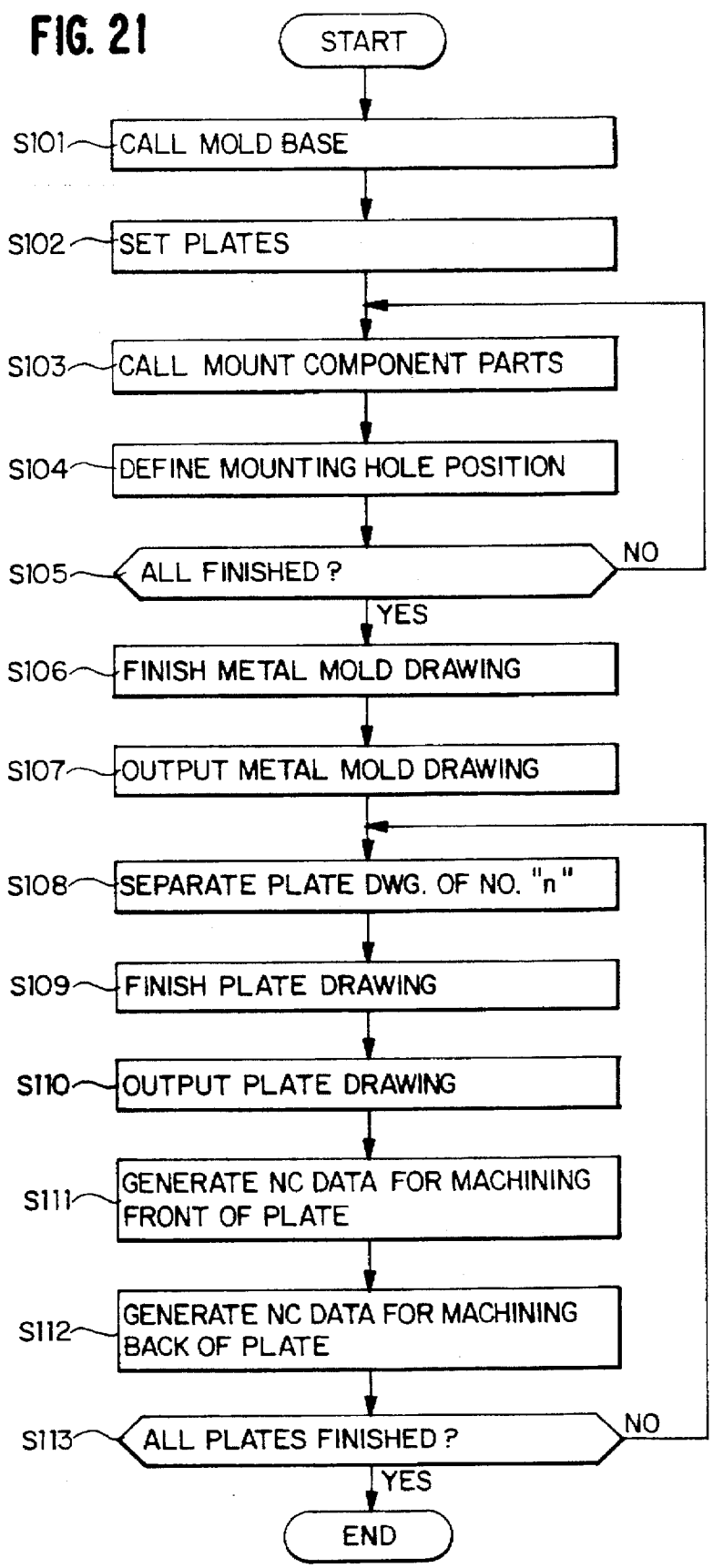
FIG. 21 is a flowchart showing procedures for a metal mold designing of the conventional CAD device for metal molds.
Figure 22:
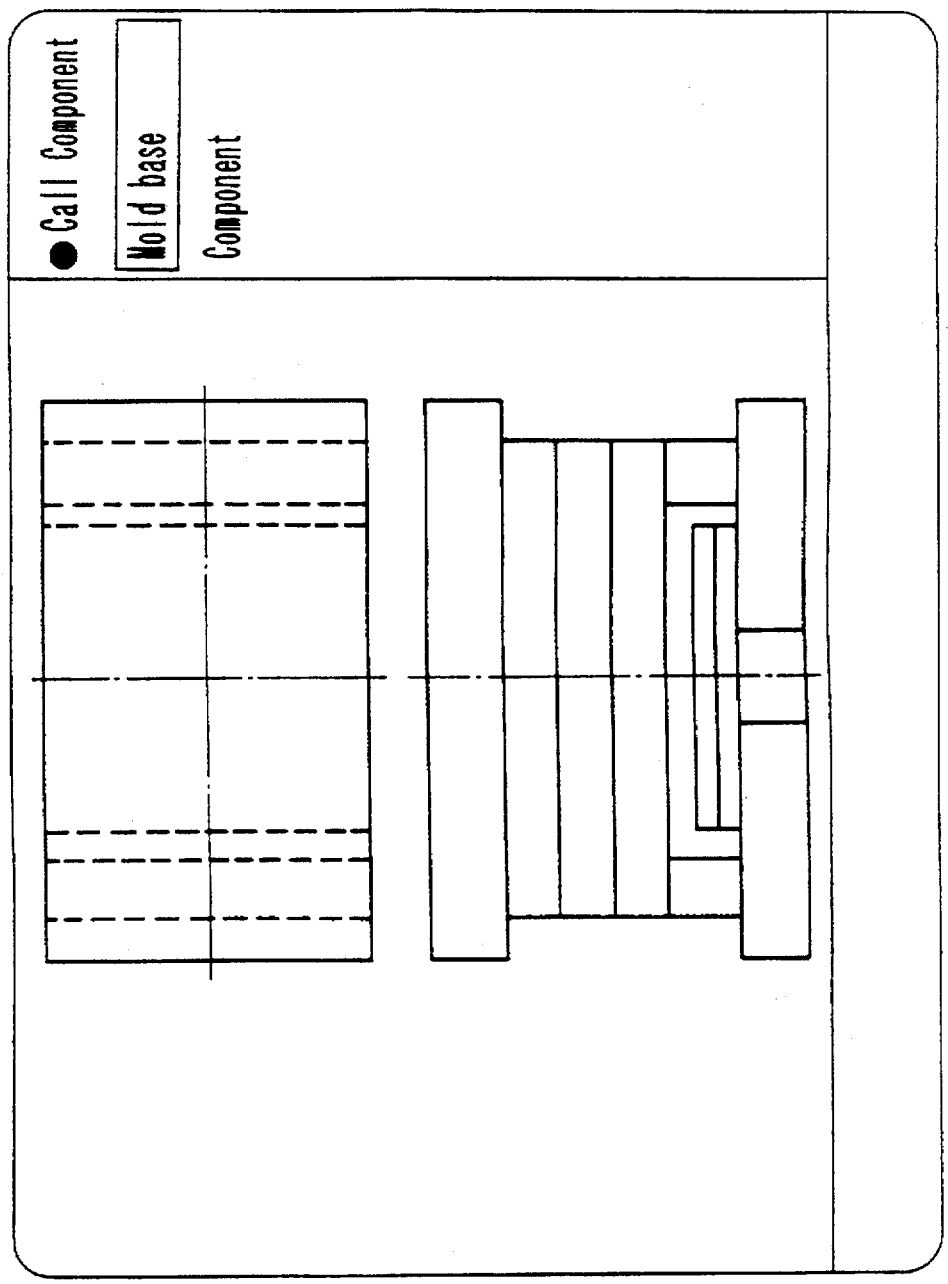
FIG. 22 is an explanatory drawing showing a screen for calling a mold base in a component invoking of the conventional CAD device for metal molds.
Figure 24:
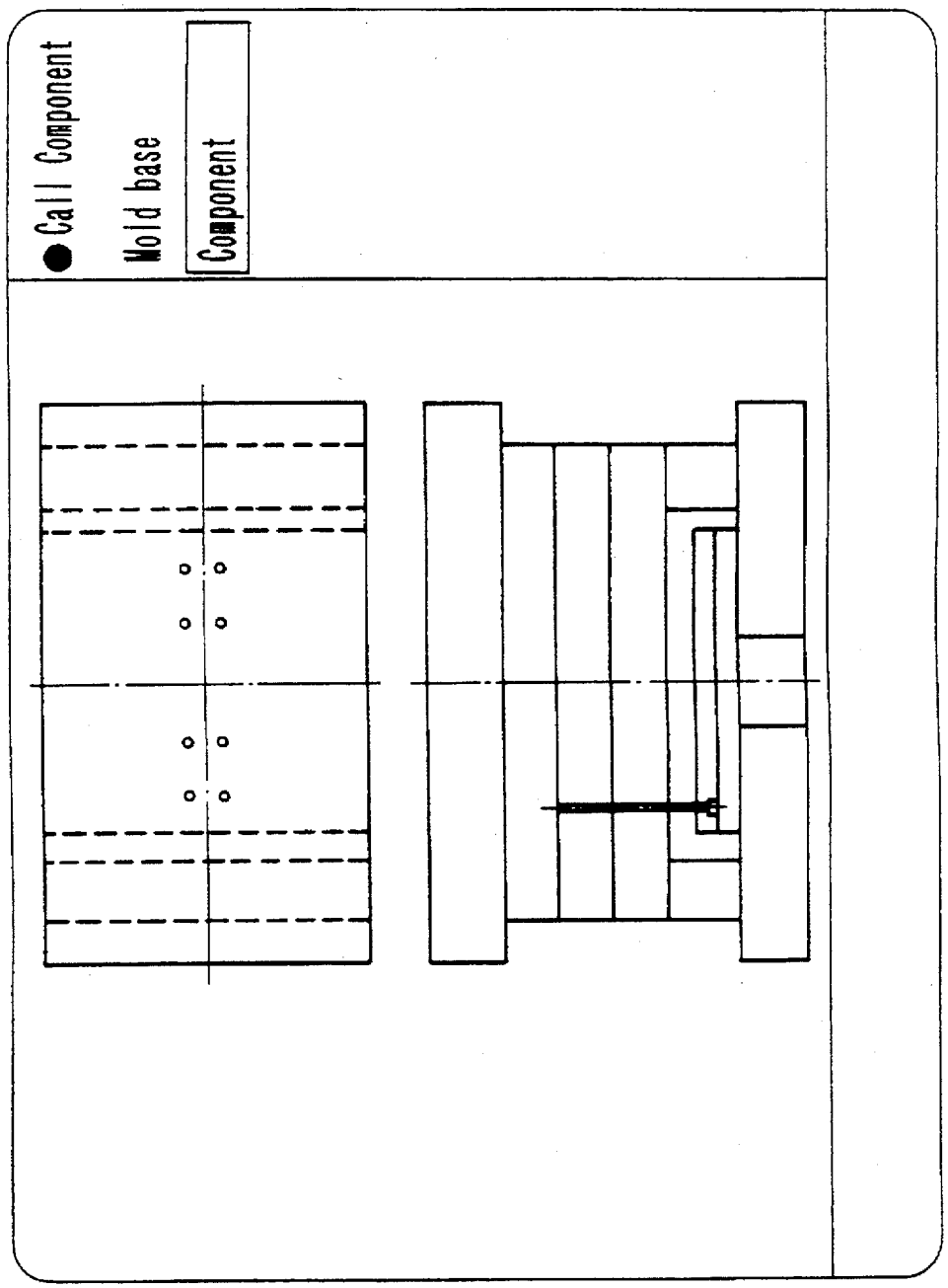
FIG. 24 is an explanatory drawing showing a screen for calling components in the component calling of the conventional CAD device for metal molds.
Figure 25:
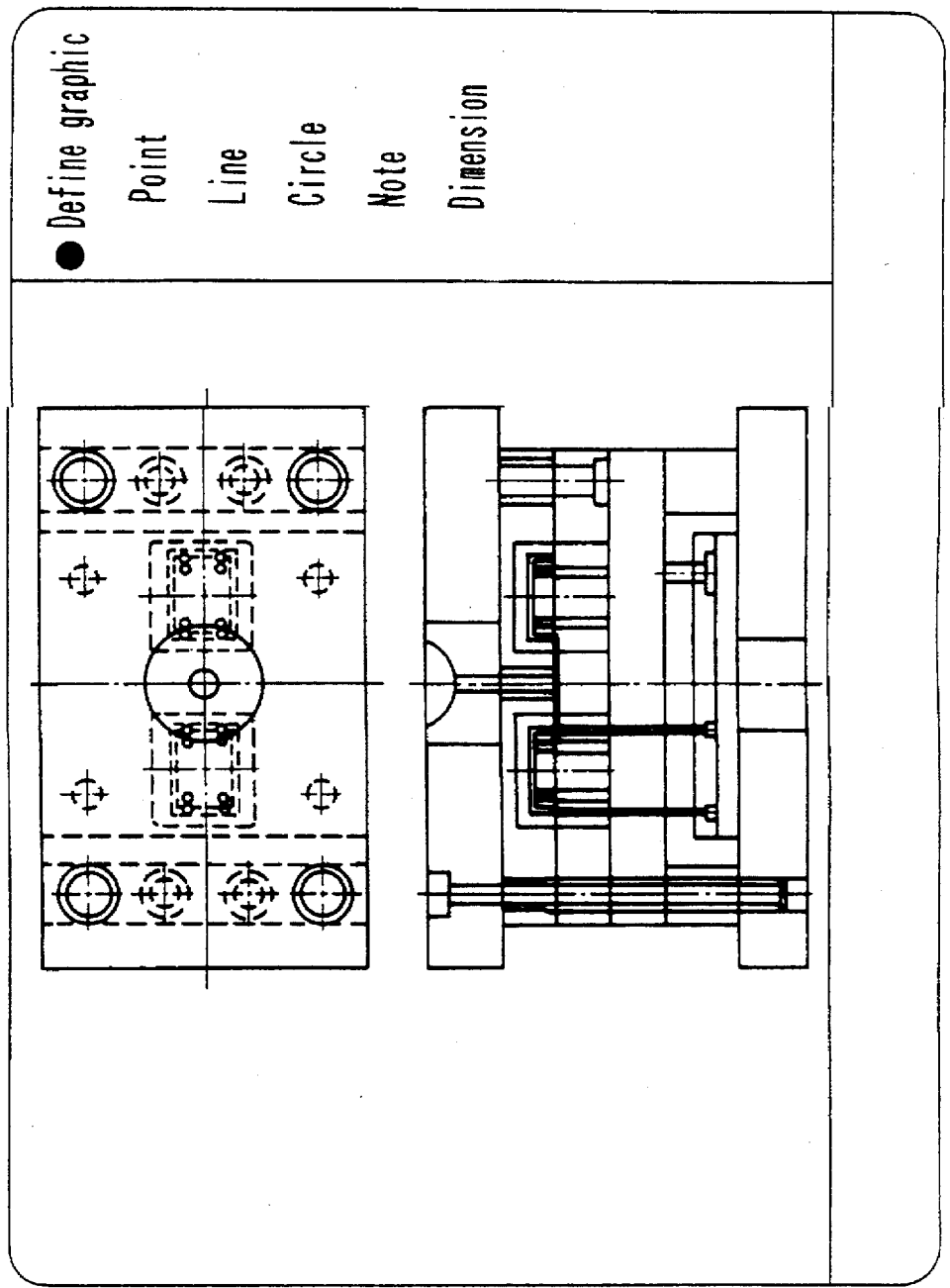
FIG. 25 is an explanatory drawing showing a screen for a graphic definition in the conventional CAD device for metal molds.
Figure 26:
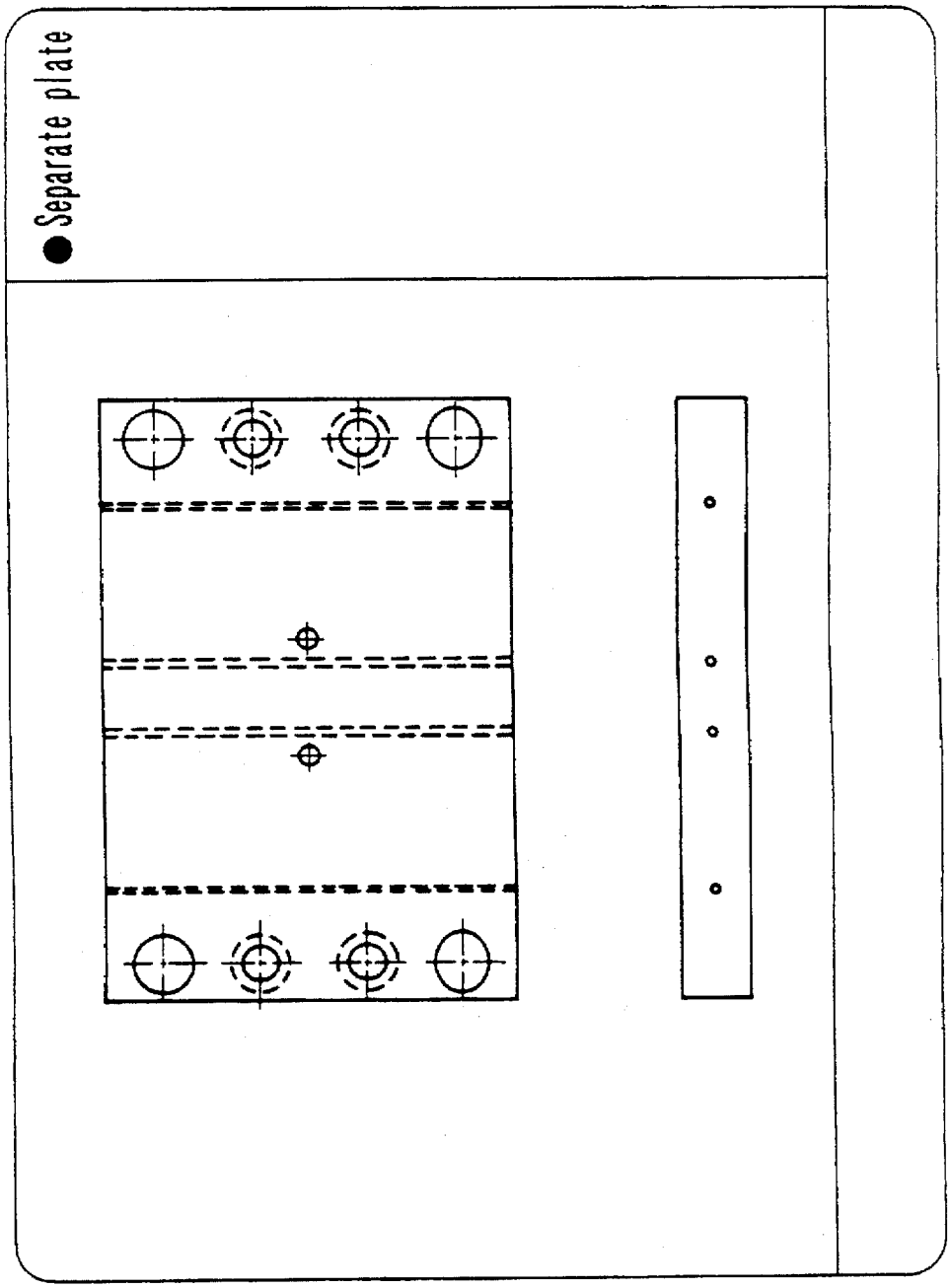
FIG. 26 is an explanatory drawing showing a screen for a plate separation in the conventional CAD device for metal molds.
Figure 27:
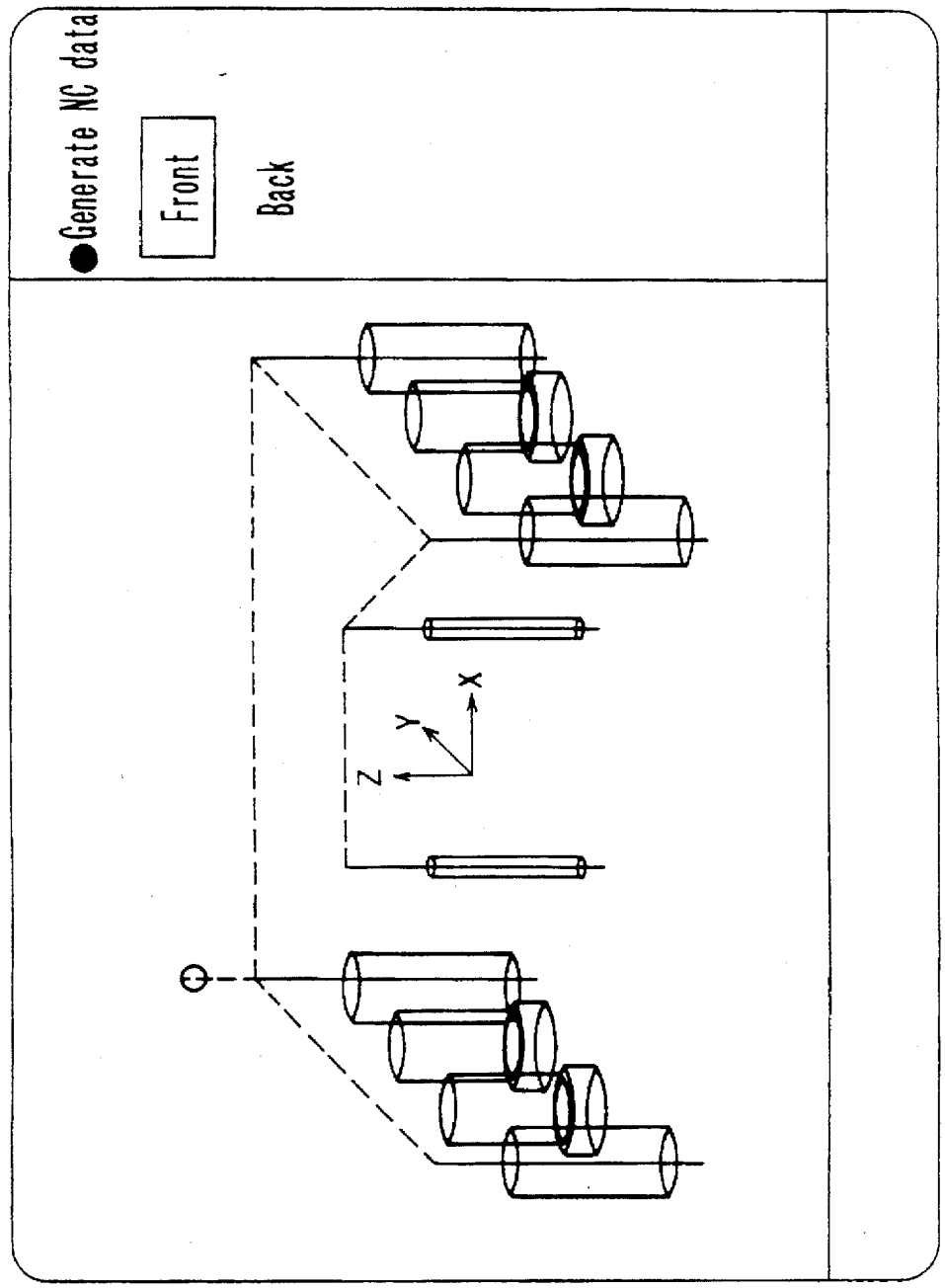
FIG. 27 is an explanatory drawing showing a screen of a front in an NC data generation in the conventional CAD device for metal molds.
Figure 28:
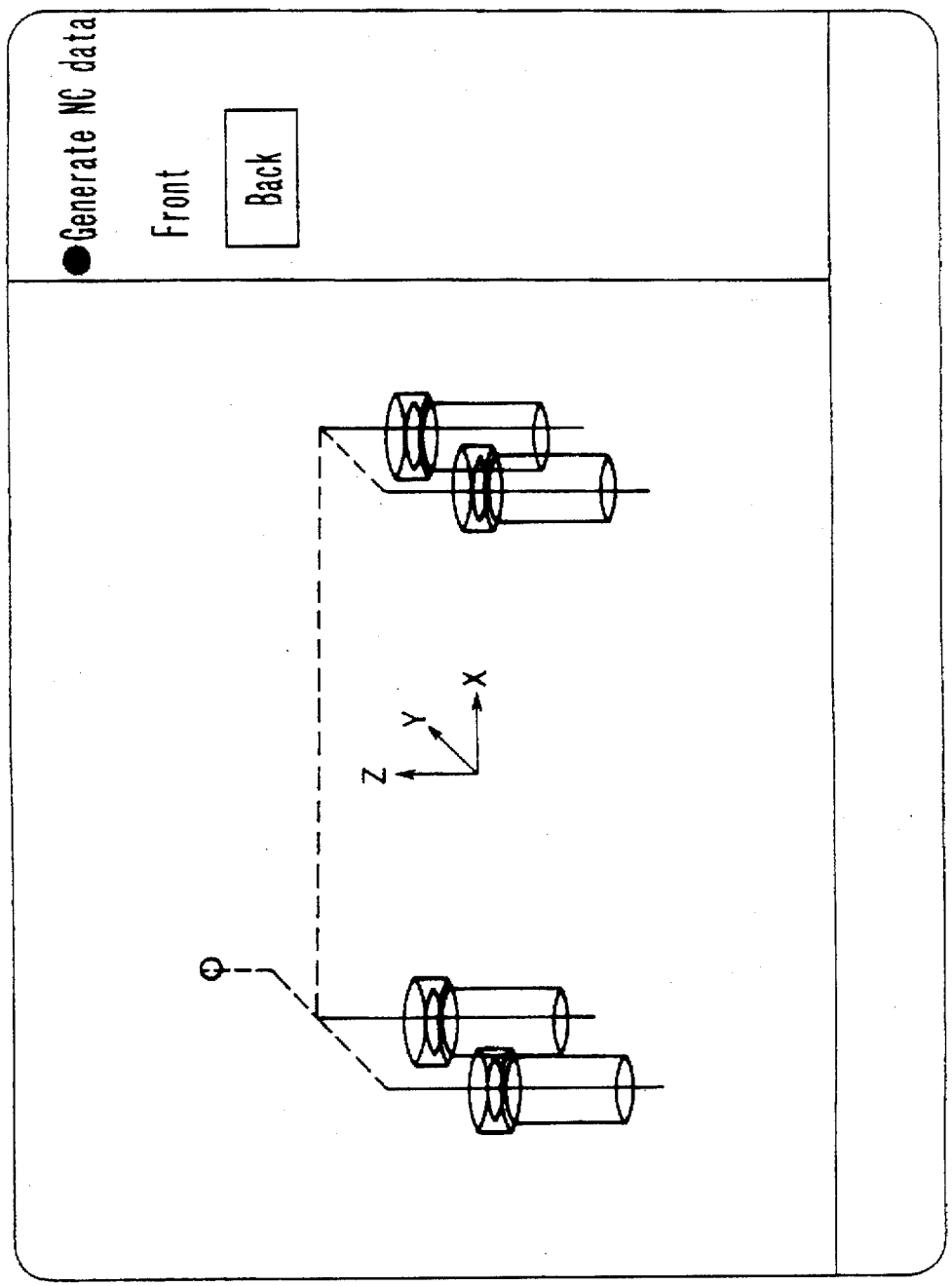
FIG. 28 is an explanatory drawing showing a screen of a back in an NC data generation in the conventional CAD device for metal molds.

Next, execution proceeds to steps S118 and S119 that constitute an NC data generating means. The step S118 performs a generating process of NC data for machining the front side of the plate or the molding piece. The step S119 performs a generating process of NC data for machining the back side of the plate or the molding piece. The operator makes up the NC data for machining the holes in the plate drawing or the molding piece drawing through the NC data generating command 4f. The NC data are to be generated twice if the plate or the molding piece should be machined both from the front and back sides. The operator designates which NC data are to be prepared, the front side or the back side, in executing the NC data generating command 4f. Proceeding to a step S120, it is decided if all the plates and the molding pieces are finished. If there is any plate or molding piece to be processed, execution returns to the step S115 and the same operations are repeated. If the NC data for machining all the plates and the molding pieces are terminated, the execution of the flowchart are ended. In the above procedures, the operator can register new graphics or the like that are generated on the display screen, as desired, in the component data base 2a of the external memory 2 through the component data base registering command 4c. The steps S115 to S120, for making up the NC data for machining the plate and the molding piece, are a stream of procedures which extend the procedures executed on the plate drawing in the conventional steps S108 to S113 of FIG. 21 to the molding piece drawing.

As described above, the present embodiment of the CAD device for metal molds may be practiced in an embodiment that comprises: the graphic defining unit that is constituted by the graphic defining command 4a to specify which a prepared graphic belongs to, among the graphics of the plates and the molding pieces that are plurally stacked to form the metal mold, and to show it on the metal mold drawing while adding necessary data; the input condition setting unit that is constituted by the plate setting command 4b to set predetermined conditions including mutual data in the plate or the molding piece; the component data base registering unit that is constituted by the component data base registering command 4c to register graphic data of the components mounted on the metal mold and machining data of the mounting holes; the component mounting unit that is constituted by the component mounting command 4d to specify mounting positions of the components on the metal mold drawing; and the separated drawing preparing unit that is constituted by the plate separating command 4e to separate the finished metal mold drawing into each plate or each molding piece to prepare the plate drawing or the molding piece drawing.

Accordingly, drawings are prepared for the molding pieces, too, in addition to the plates that form the metal mold, by the similar process of operations, using each command: the graphic defining command 4a in the graphic defining unit, the plate setting command 4b in the input condition setting unit, the component data base registering command 4c in the component data base registering unit, the component mounting command 4d in the component mounting unit, the plate separating command 4e in the separated drawing preparing unit.

As a result, it is possible to efficiently prepare the drawings of the plates and the molding pieces in the metal mold design.

Figure 5A:
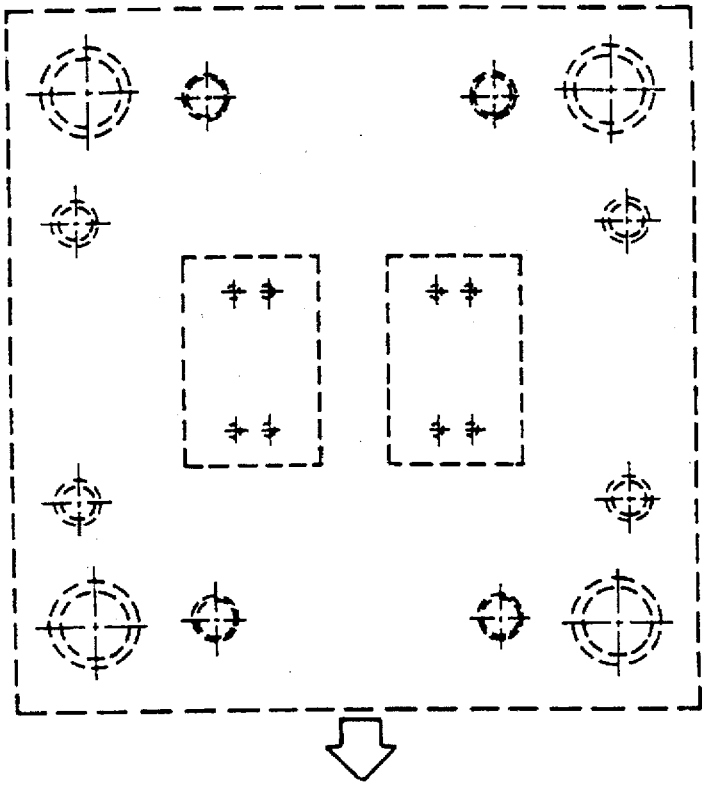
FIGS. 5a and 5b are explanatory drawings showing a change of a kind of line of a hole in separating plates in one embodiment of an inventive CAD device for metal molds.
Figure 5B:
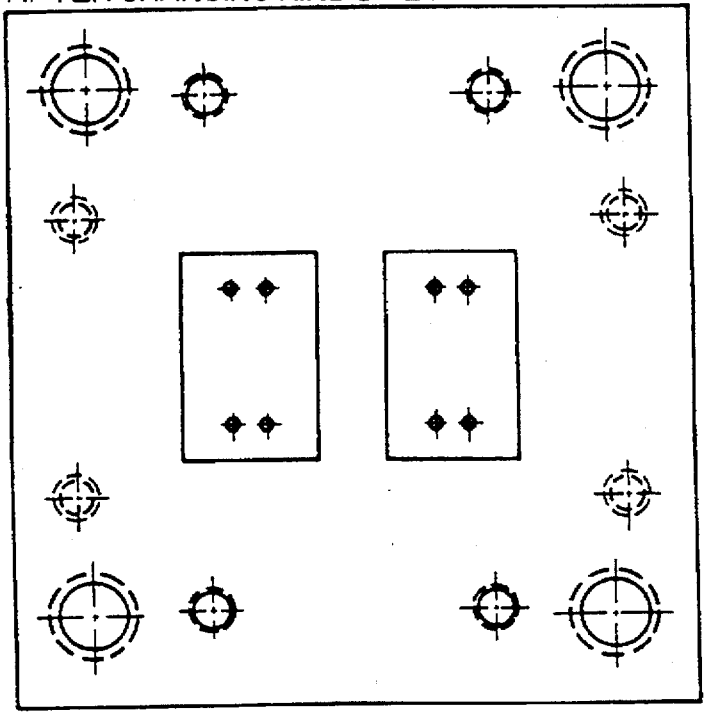

The plate setting command 4b constituting the input condition setting unit also achieves the objects as follows. In the conventional device, it is necessary to change kinds of lines of holes after separating the plates. In a drawing of an assembled metal mold, most of plates and molding pieces are laid under some plates or molding pieces. Hidden holes should be shown by a broken line in plan view. However, after the separation of the plates, there are no overlying plates or molding pieces. Accordingly, it is necessary to change the broken lines of the holes into solid lines. FIGS. 5a and 5b show a change of a kind of line in taking apart the moving template N5 (plate no. 5). FIG. 5a shows a drawing just after separating the plates. FIG. 5b shows a drawing after the change of the kind of line of the plate. As shown in FIGS. 5a and 5b, when separating the plates, it is not enough to merely correct the broken lines into solid lines; only the broken lines that are seen from the front side of the plate or the molding piece should be changed into solid lines. The lines that are placed on the back side of the plate or the molding piece should remain broken. Such a work is very laborious for a complicated plate or molding piece, since a hole may be sometimes composed of many circles.

In view of the above, the inventive device of this embodiment provides the plate state setting area 13 and the molding piece state setting area 19 as the conditions of the screen for carrying out the plate setting and the molding piece setting. Five states can be set as these input items: "absent", "normal", "hidden", "reverse" and "reverse and hidden". Among them, the "absent" shows that the corresponding plate or molding piece is not used. The "normal" shows that it is disposed at an uppermost position. The "hidden" shows that it is laid under some other plates. The "reverse" and "reverse and hidden" will be described later. If the operator sets the input items, it is succeeded to a setting of the kind of line of the component part mounting holes which are generated on the plate or molding piece thereafter. If the setting is changed, the kinds of lines of the mounting holes that have already been generated are automatically changed. With such a construction, the above mentioned problems can be overcome. It is possible to easily change the kinds of lines of the holes between the case of the assembled state drawing and the case of separating the plate and the molding piece. The setting is automatically performed just after the mold base has been called.

As mentioned above, the input condition setting means which is constituted by the plate setting command 4b of the CAD device for metal molds of this embodiment may be practised in an embodiment that can set the mutual data for each plate and each molding piece that show if it is disposed uppermost or laid under and hidden by other plates or molding pieces, automatically change the displayed state of each hole, between the broken line and the solid line, that is defined and provided on the plate or the molding piece, according to the change of the states, and prepare the graphics of the newly defined holes according to the setting.

Accordingly, it is possible to set each plate or each molding piece if it is disposed uppermost or laid under and hidden by other plates or molding pieces. The displayed state of each hole that is defined and provided on the plate or the molding piece is automatically changed between the broken line and the solid line according to the change of the states. The graphics of newly defined holes are prepared according to the setting.

As a result, the vertical positional relationship of each plates and each molding pieces is clear on the metal mold drawing. Moreover, it performs automatically the operation to make the displayed state of each hole that is defined and provided on the plate or the molding piece into the solid line or the broken line.

Figure 6A:
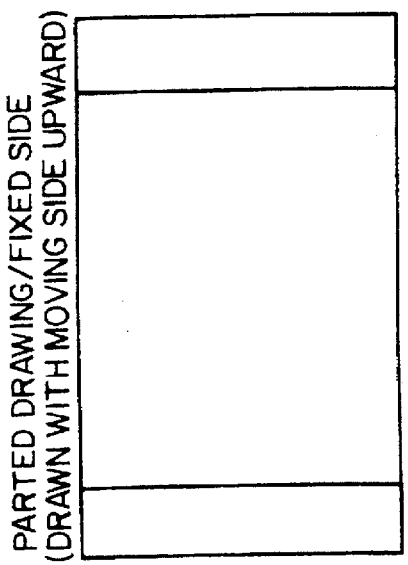
FIGS. 6a–6d are explanatory drawing showing a preparation of a drawing by a parted drawings in one embodiment of an inventive CAD device for metal molds.
Figure 6C:
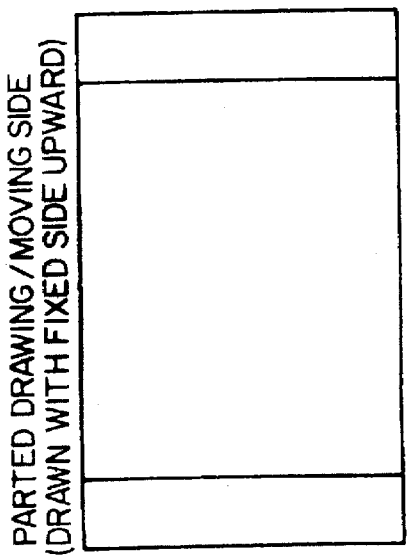
Figure 6B:
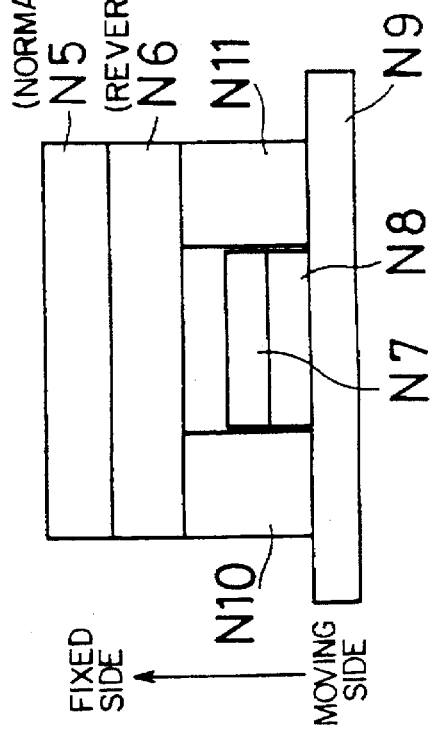
Figure 6D:
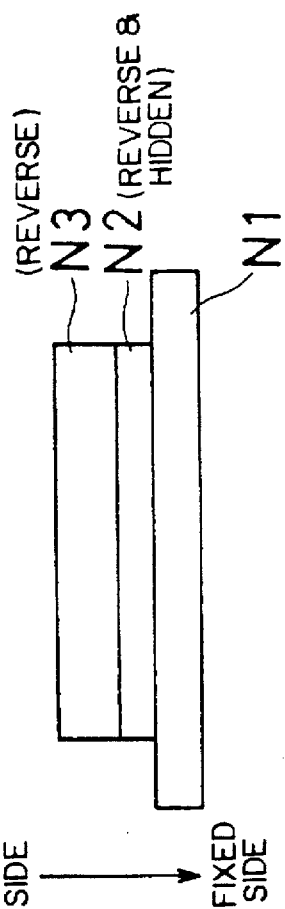

The plate setting command 4b that constitutes the input condition setting unit of the present embodiment of the device also solves the below mentioned object. In the conventional device, a designing in the form of a parted mold drawing is sometimes confusing, when designing the metal mold drawing. This problem is described referring to the parted mold drawing of FIGS. 6a–d. FIG. 6a is a plan view of a moving side in the parted mold drawing. FIG. 6b is a front view of the moving side in the parted mold drawing. FIG. 6c is a plan view of a fixed side in the parted mold drawing. FIG. 6d is a front view of the fixed side in the parted mold drawing.

In case of preparing the parted mold drawings as shown in FIGS. 6a–d, since the fixed side is shown in a reversed state at a parting surface, it is difficult to determine which is the front side or the back side of the plate. If the front side and the back side are made upside down, kinds of lines of holes need to be changed. A two plate type metal mold is only separated into two. However, in case it is composed of three plates or the like and many separating surfaces are shown, it is more complicated. The parted mold drawing is often used in designing the metal mold. Thus, there have been requests to solve such a problem in any way.

In view of the above, the present embodiment of the device provides a condition that "the fixed side is always a front side", and the before mentioned state items are set for each of the plates and molding pieces. Thus, the operator can easily and freely draw this parted mold drawing. The "normal" and the "hidden" show that it is disposed with the fixing side upward (front side upward). The "reverse" and the "reverse and hidden" show that it is disposed with the moving side upward (back side upward). The difference between the "reverse" and the "reverse and hidden" is the same as the difference between the "normal" and the "hidden". When the operator sets this condition, it is succeeded to a setting of the kind of line of the component part mounting holes which are generated on each plate or molding piece. If the setting is changed, the kinds of lines of the holes that have been already generated are automatically changed. With such a construction, the above mentioned problems can be overcome.

In case of designing by use of the parted drawings, if the setting is as shown in FIG. 7, the following procedures can be dealt with in the same manner as the case of non-parted drawings. In case of FIG. 7, the plate No. 1 to the plate No. 3 defining the fixed side are reversed. Accordingly, the plate No. 3 is arranged uppermost and set into "reverse", and the plates No. 1 and No. 2 are set into "reverse and hidden". In the moving side, the plate No. 5 is arranged uppermost and set into "normal". The others are set into "hidden". If a hole is defined after the above setting, it is decided automatically, according to the setting, if the plan view of the hole is drawn by a solid line or a broken line.

As mentioned above, the input condition setting means which is constituted by the plate setting command 4b of the CAD device of this embodiment may be practised into an embodiment that can set the above mentioned mutual data for each of the plates and molding pieces to show if it is disposed with the fixed side upward or the moving side upward in the metal mold drawing, can automatically change the displayed state, that is shown by the solid line or the broken line, of each hole which is defined and provided on the plate or the molding piece, according to the change of the setting, and can prepare the graphics of the newly defined holes according to the setting.

Accordingly, it is possible to specify and set the direction of the fixed side or the moving side for each plate or each molding piece in the metal mold drawing by the input condition setting means. The displayed state of each hole which is defined and provided on the plate or the molding piece is automatically changed according to the change of the setting. The graphics of the newly defined holes according to the setting.

As a result, the vertical relationship of the plates and the molding pieces becomes clear in the metal mold drawing, by specifying the direction of the fixed side or the moving side. Thus, the operation successfully makes the displayed state of each hole, that is defined and exists on each plate or each molding piece, into the solid line or the broken line.

Figure 8A:
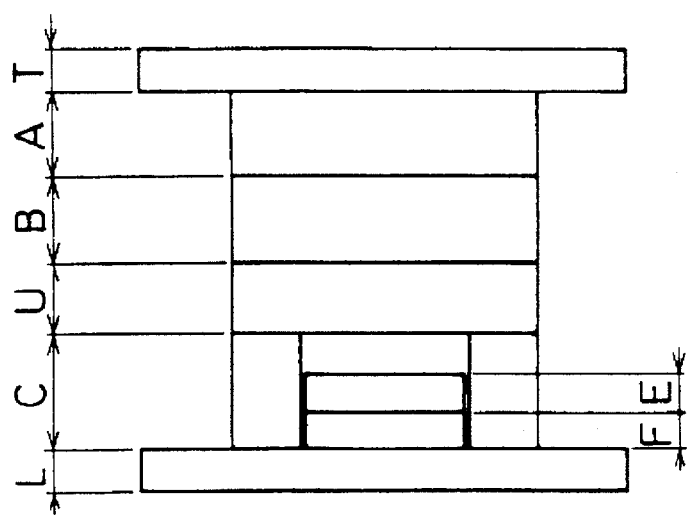
FIGS. 8a–8c are explanatory drawing showing differences of a variety of metal mold structures to which one embodiment of an inventive CAD device for metal molds is applied.
Figure 8B:
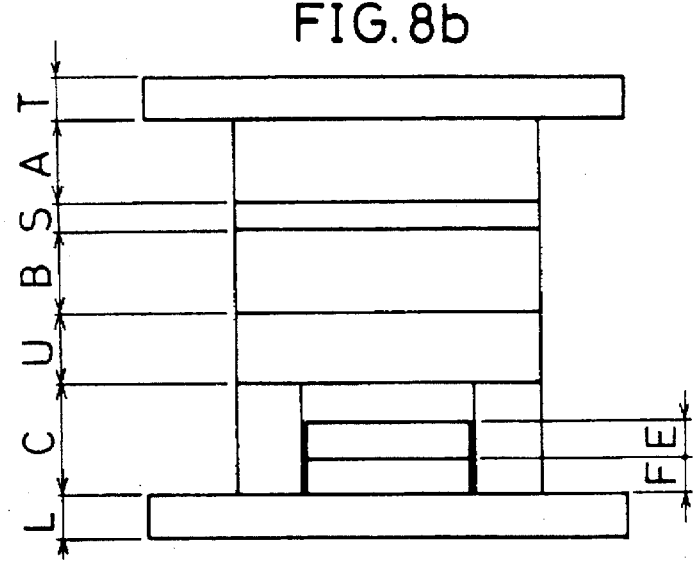
Figure 8C:
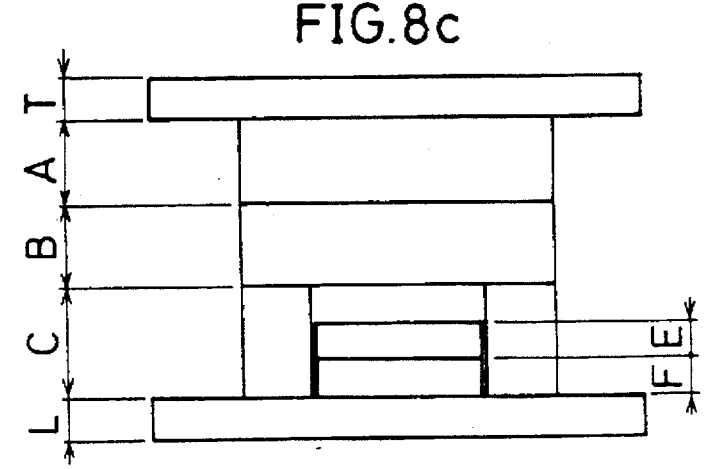

The plate setting command 4b that constitutes the input condition setting means of the present embodiment also achieves the below mentioned object. FIGS. 8a–8c show a variety of plate structures of metal molds. In the figures, there are shown a fixed bottom plate T, a fixed template A, a stripper plate S, a moving template B, a wear plate U, a spacer block C, an upper ejector plate E, a lower ejector plate F and a moving bottom plate L. FIG. 8a does not have a stripper plate S but has a wear plate U. FIG. 8b has both a stripper plate S and a wear plate U. FIG. 8c does not have neither a stripper plate S nor a wear plate U. The structures plate structure are changed so as to select the most suitable plate structure according to a shape or a dimension of a molded article.

Here, the operator wishes to determine the kind of the plate or molding piece corresponding not to the plate name or the molding piece name but to the plate number or the molding piece number, e.g. giving a plate no. 5 for the moving template, and a plate no. 7 for the upper ejector plate. Namely, a designation of a plate number is complicated if the moving template is a plate No. 3 in one case and a plate No. 4 in another case according to differences of the plate structures. Therefore, in the conventional device, in order to solve the above problems, e.g. in the plate setting of FIG. 23, the thickness of the stripper plate of the plate No. 4 is made zero to show that this plate is not used.

With this method, the stripper plate is formally present, so that, when component parts are mounted, holes are generated on the stripper plate that is not actually present. Namely, unnecessary holes would be shown in a prepared plan view or the like, and it becomes different from a desired drawing.

In view of the above, the present embodiment of the device makes it possible to set "absent" as a condition in the plate state setting area 13, through the plate setting command 4b that constitutes the input condition setting unit such as the runner stripper plate of the plate No. 2 in FIG. 1. It eliminates component part mounting holes for the plate which is out of use and to which the "absent" is set, thereby preventing their generation. Thus, unnecessary holes are prevented from generating, and a correct plan view or the like can be obtained.

As mentioned above, the input condition setting means constituted by the plate setting command 4b of the present embodiment of the CAD device for metal molds may be practised in an embodiment that can set "out of use" for the plate or the molding piece which is omitted according to a structure of the metal mold to be designed. Moreover, the component mounting means constituted by the component mounting command 4d may be practised in an embodiment that makes it impossible to define any component part mounting holes for the plate or the molding piece that has been set into "out of use".

Accordingly, it is possible to set a using condition for the plate or the molding piece that is omitted according to a designed metal mold structure by the input condition setting means. Moreover, the component mounting means makes it impossible to define any component part mounting holes for the plate or the molding piece that has been set to be omitted.

As a result, when setting the plates and the molding pieces, it is enough to input only the plates and the molding pieces corresponding to the designed metal mold structure, and unnecessary component part mounting holes are not generated for the unused plates or molding pieces.

The plate setting command 4b that constitutes the input condition setting means of the present embodiment of the device achieves the below mentioned object. A prehardened steel or the like is used in addition to a common carbon steel as a material for the plate or the molding piece that form the metal mold. Accordingly, the machining of the mounting holes for the component parts should be carried out under a condition taking into account the material of the plate or the molding piece. However, the conventional device is only capable of registering just one common kind of machining condition in the simple hole machining data base 2d. It cannot select the most suitable machining condition for such a metal mold as uses different material for each of the plates and the molding pieces.

In view of the above, the plate setting command 4b of the present embodiment of the device provides the plate material setting area 16 and the molding piece material setting area 24, as conditions in the screen for carrying out the plate setting of FIG.1 and the molding piece setting of FIG. 2. In this case, the conditions are set as follows: S55C is used for the plate, and NAK55 is used for the molding piece. The operator chooses one to be used this time among materials of the plates or the molding pieces that have been registered beforehand in the system. The component mounting command 4d of the present embodiment of the device is structured such that, when it mounts component parts and produces mounting holes, it changes the machining conditions that have been registered in the simple hole machining data base 2d by use of the material data of the plate or the molding piece. Thus, it is capable of attenuating a change due to the material. present system has a rule for each material with respect to a way of changing the machining condition according to the material. For example, the rule is such that, since one material can be machined at a speed "α" times as fast as the standard type carbon steel, the condition is multiplied by the coefficient "α".

FIG. 8d is a table for registering machining conditions respectively for materials of works. A column 25 lines up the materials. A column 26 shows tool diameters [mm]. A column 27 illustrates rotation speeds [rpm] of the tools. A column 28 shows feed speeds [mm/sec] of the tools. A user inputs these necessary items beforehand in the corresponding columns of the table for after use. The microprocessor in the inventive CAD device retrieves this table on the basis of a material of a work and a hole diameter or a tool diameter so as to obtaining corresponding rotational speed and feed speed, thereby reflecting them on the NC data.

Illustratively, the set materials are S55C, SKD11 and NAK55, and the set tool diameters are 10 mm, 20 mm and 30 mm. Actually, all the combinations thereof that are intended to be used are registered in the table. In the table, since a hardness is higher in order of S55C<SKD11<NAK55, the corresponding rotational speed and feed speed are made lower in reversed order.

As mentioned above, the input condition setting means constituted by the plate setting command 4b of the present embodiment of the CAD device for metal molds may be practised in an embodiment that can set the material of the plate and the molding piece. The component mounting means may be practised in an embodiment that changes the machining condition of the mounting holes according to the set material of the plate or the molding piece.

Accordingly, it is possible to set the material of the plate or the molding piece through the input condition setting means, and change the machining condition of the mounting holes according to the character of the material of the plate or the molding piece through the component mounting means.

As a result, it is possible to set the material of the plate or the molding piece, change the machining condition of the mounting holes from the standard condition, according to the character of the material of the plate or the molding piece, and make it corresponding to the change of the material of the plate or the molding piece.

It is described supplementarily hereunder how the above contents are internally processed in the device of the present embodiment.

Figure 9:
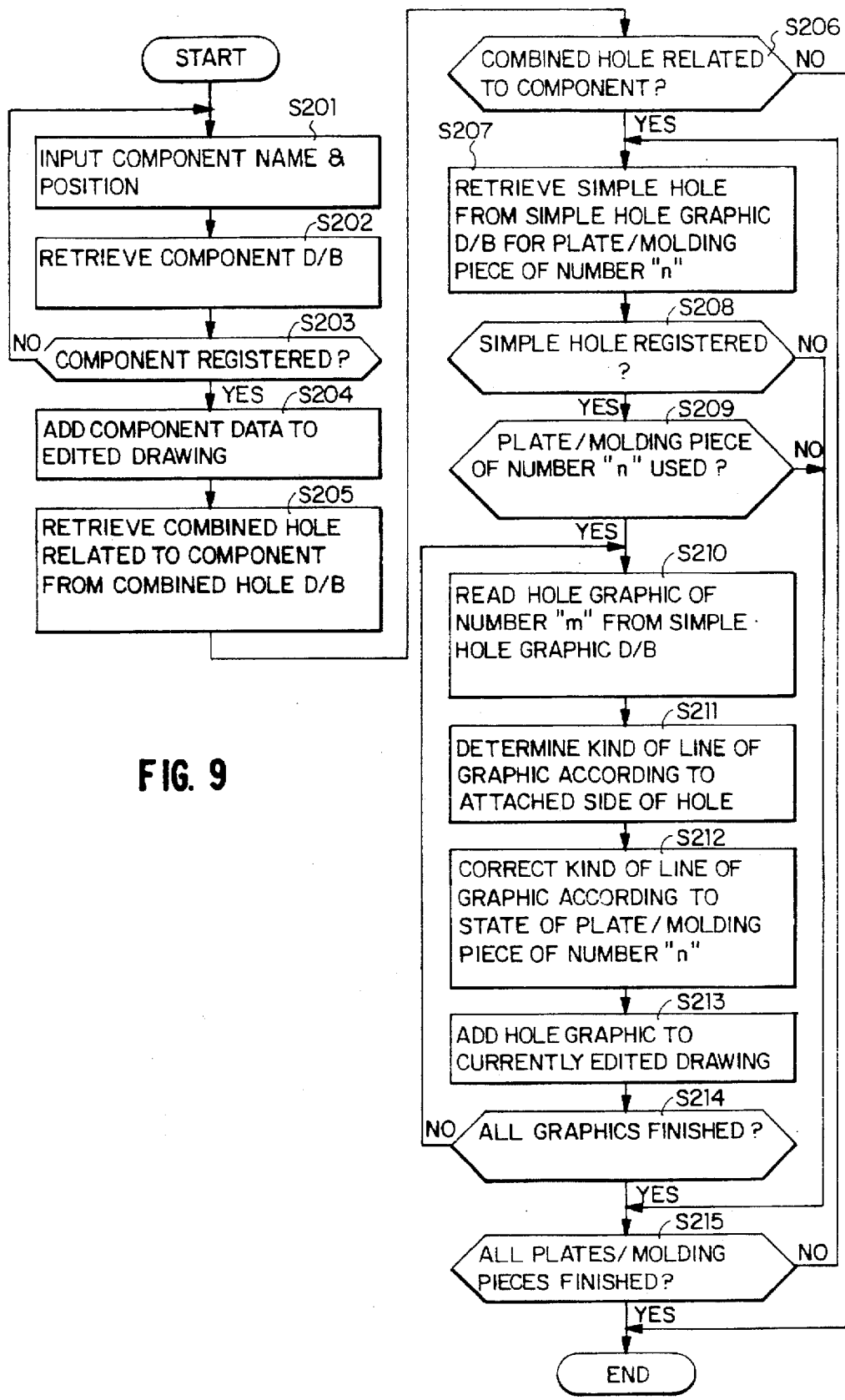
FIG. 9 is a flowchart showing an internal processing of a component part/hole setting in one embodiment of an inventive CAD device for metal molds.

FIG. 9 is a flowchart showing an internal processing of the component part/hole setting.

According to the procedures of the flowchart of FIG. 9, first of all, if the operator inputs data of a component name and a mounting position in a step S201. Proceeding to a step S202, retrieval is made if the component name is registered in the component data base 2a. Proceeding to a step S203, if the component part is registered, execution proceeds to a step S204. If not, execution returns to the step 201 and the operator is demanded to input another. In the step 204, component data (graphic data) are added to the drawing data that are being edited. Then, a graphic of the component part is displayed on the screen. Execution proceeds to a step S205, and retrieval is made if a combined hole related to the component part is registered in the combined hole data base 2b. Proceeding to a step S206, if the combined hole is not related to the component part, the present flowchart is ended. If there is a combined hole related to the component part, execution proceeds to a step S207. In the step S207, a simple hole that corresponds to the plate or the molding piece of a number "n" is retrieved from the simple hole graphic data base 2c, in order to attach the hole to each plate or each molding piece. Proceeding to a step S208, if the simple hole is not present, execution proceeds to a below described step S215. If the simple hole is present, execution proceeds to a step S209. In the step S209, if the state of the plate or the molding piece of the number "n" is "absent" and not set to be used, execution proceeds to a step S215. If the state of the plate or the molding piece of the number "n" is other than "absent" and set to be used, execution proceeds to a step S210.

In the step S210, a hole graphic of a number "m" is read out of the simple hole data base 2c. In the following steps S211 to S213, some items are checked for each number constituting the simple hole, namely, whether it is the front side or the back side and what the state of the plate or the molding piece is. The steps determine the kind of line of the prepared hole graphic and whether it is drawn by a solid line or a broken line, according to whether the simple hole is a hole from the front or a hole from the back and according to the state of the plate or the molding piece of the number "n". The steps add it to the currently edited drawing. Then, execution proceeds to a step S214, and the same procedures are repeated until the steps from S210 to S214 are terminated for each number. If all the numbers are finished with the procedures, execution proceeds to a step S215. In the step S215, the same procedures are repeated until the procedures of the steps from S207 to S215 are terminated for each plate or each molding piece. If all the plates and the molding pieces are finished with the procedures in the step S215, the graphics of the component parts and the holes are displayed on the screen, and the present flowchart is ended.

FIG. 10 is a flowchart showing an internal processing of a plate/molding piece state change.

According to the procedures of the flowchart of FIG. 10, first of all, in a step S301, a state of a plate or a molding piece is inputted as a change of the state of the plate/molding piece. Execution proceeds to a step S302, and the state of the condition of the plate or molding piece of the number "n" is compared with the last one. In a next step S303, if the compared state is the same as the last one, execution proceeds to a below mentioned step S309. If the state is different from the last one, execution proceeds to a step S304, and it is decided if the state of the plate or molding piece of the number "n" is set in other than "absent" and to be used or not. If the state of the plate or the molding piece of the number "n" is "absent" and out of use in the step S304, execution proceeds to the below mentioned step S309. If the plate or molding piece of the number "n" is set to be used, execution proceeds to a step S305. The step S305 reads out one graphic element from the data of the currently edited drawing. Then, execution proceeds to a step S306, and if the graphic element belongs to the plate or molding plate of the number "n", execution proceeds to a step S307. The step S307 changes the kind of line according to the state of the plate or molding piece of the number "n". If the graphic element read out in the above mentioned step S306 does not belong to the plate or molding piece of the number "n", execution skips the step S307. Proceeding to a step S308, the same procedures are repeated until all the graphic elements have been finished with the procedures of the steps S305 to S308. If all the graphic elements have gone through the procedures, execution proceeds to the step S309. In the step S309, the same procedures are repeated until all the plates and the molding pieces have been finished with the procedures of the steps S302 to S309. If all the plates and the molding pieces are finished with the procedures, the present flowchart is ended.

FIG. 11 is a flowchart showing an internal processing of a plate/molding piece separation and storage.

According to the procedures of the flowchart of FIG. 11, first of all, a separating plate number or molding piece number is inputted in a step S401 as a separation and a storage of the plate or the molding piece. Execution then proceeds to a step S402, and it is decided if the state of the plate or molding piece of the number "n" is other than "absent" and set to be used or not. If the state of the plate or molding piece of the number "n" is "absent" and set out of use in the step S402, execution proceeds to a below mentioned step 409. If the plate or molding piece of the number "n" is set to be used, execution proceeds to a step S403. In the step S403, a file for storing the drawing is opened or prepared. Proceeding to a step S404, one graphic element is read out of the data of the currently edited drawing. Then, proceeding to a step S405, if the graphic element belongs to the designated plate or molding piece, execution proceeds to a step S406. In the step S406, the graphic element is stored in the file after having a kind of line thereof changed. At this time, in case the state of the plate or molding piece is "hidden", the line may be changed from a broken line to a solid line in a drawing after separating the plate or the molding piece. So, the storage is made in consideration thereof. If the graphic element read out in the above mentioned step S405 does not belong to the designated plate or molding piece, execution skips a step S406. Proceeding to a step S407, the same procedures are repeated until all the graphic elements have been finished with the procedures from the step S404 to the step S407. If all the graphic elements have been finished with the procedures in the step S407, execution proceeds to a step S408. In the step S408, the file for storing the drawings is closed, and execution proceeds to a step S409. Then, the same procedures are repeated until necessary plates and molding pieces have been finished with the procedures from the step S401 to the step S409. If all the necessary plates and molding pieces have been finished with the procedures, the present flowchart is ended.

An improvement with respect to registration of the component part data base 2a is described hereunder.

There is provided one case for registering a hole which needs to be machined from the front and the back of a plate at the same time. In case of spot-facing both from the front and the back, it is possible to machine it only from the front by use of an inverted spot-facing tool. However, it is more efficient to perform it while reversing the plate, as the number enlarges. The conventional device cannot register such kind of hole, so that it performs the machining by use of some special means, e.g. substituting another shape of hole for it.

In view of the above, the present embodiment of the device has an improvement in the component data base registering command 4c that constitutes a component data base registering means.

First, the hole of FIGS. 12a is separated into a hole KFZ of FIG. 12b that is machined from the front and a hole KWR of FIG. 12c that is machined from the back. For each, a graphic is registered in the simple hole graphic data base 2c and a machining method is registered in the simple hole machining data base 2d. Then, the holes KFZ and KWR are registered in combination into the combined hole data base 2b by use of a setting screen shown in FIG. 12d. Here, FIG. 12d has a registration item 51 for the holes that are machined from the front and a registration item 52 for the holes that are machined from the back. In FIG. 18 that shows a setting screen of the conventional device, only one of the front hole and the back hole can be registered for one plate. To the contrary, in FIGS. 12a–12d that shows the setting screen of the present embodiment of the device, both can be registered at the same time. With respect to the registration items 51, 52, when there are no holes machined in that direction, they are left blank, so that all that can be registered as shown in FIG. 18 can also be registered in FIG. 12d.

Regarding the operation after the registration, when generating final NC data, the hole KFZ is machined at the time of machining from the front, and the hole KWR is machined at the time of machining from the back. Thus, these kinds of holes can be treated just in the same way as prior art. Provided that the machining work from the back be done after the machining work from the front, the hole KWR is registered in the simple hole machining data base 2d such that neither a center hole nor a prepared hole is machined but that only a spot-facing is performed.

As mentioned above, in the present embodiment of the CAD device for metal molds, the component data base registering means constituted by the component data base registering command 4c may be practised in an embodiment that can register both the front and the back of the combined hole if it needs to be machined from the front direction and the back direction of one plate or one molding piece, at the time of registering the combined holes as the component part mounting holes for a plurality of plates and molding pieces by combining a plurality of simple hole shapes that register data of a hole shape and a machining for one plate or one molding piece.

Accordingly, if a plate or a molding piece needs to be machined from the front and the back simultaneously at the time of registering the combined holes as the component part mounting holes for a plurality of plates and molding pieces by combining a plurality of simple hole shapes for one plate or one molding piece, the front and the back are registered at the same time.

As a result, even if a plate or a molding piece needs to be machined from the front and the back at the same time, the registration can be done samely as the case of machining either one side of the front and the back.

Figure 13A:
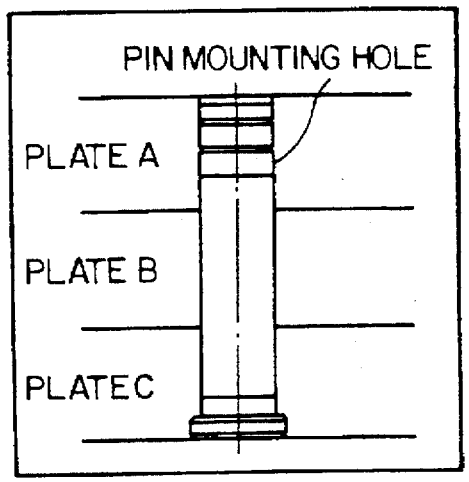
FIGS. 13a–13c are explanatory drawing showing a case in which component part mounting holes are overlapped in one embodiment of an inventive CAD device for metal molds.
Figure 13B:
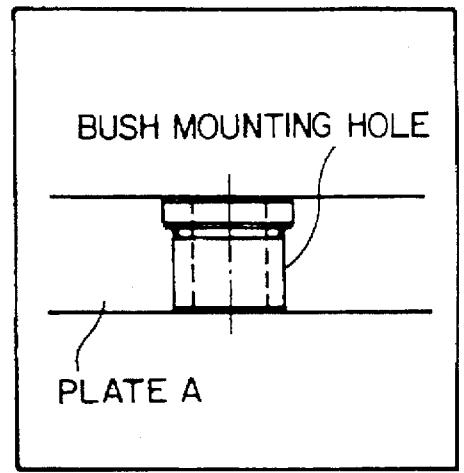
Figure 13C:
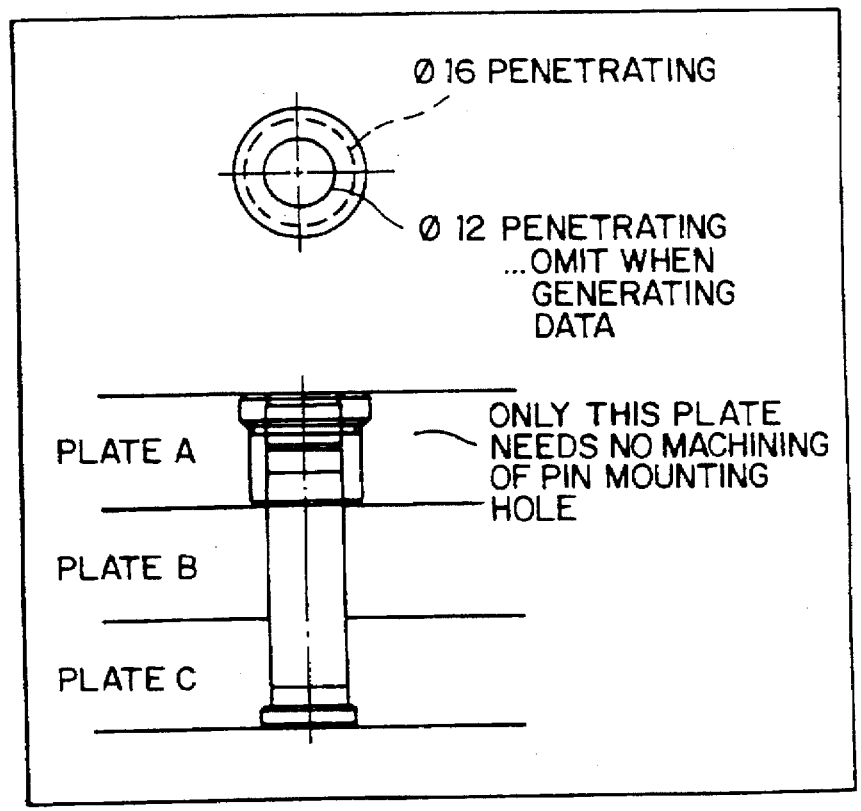
Figure 16:
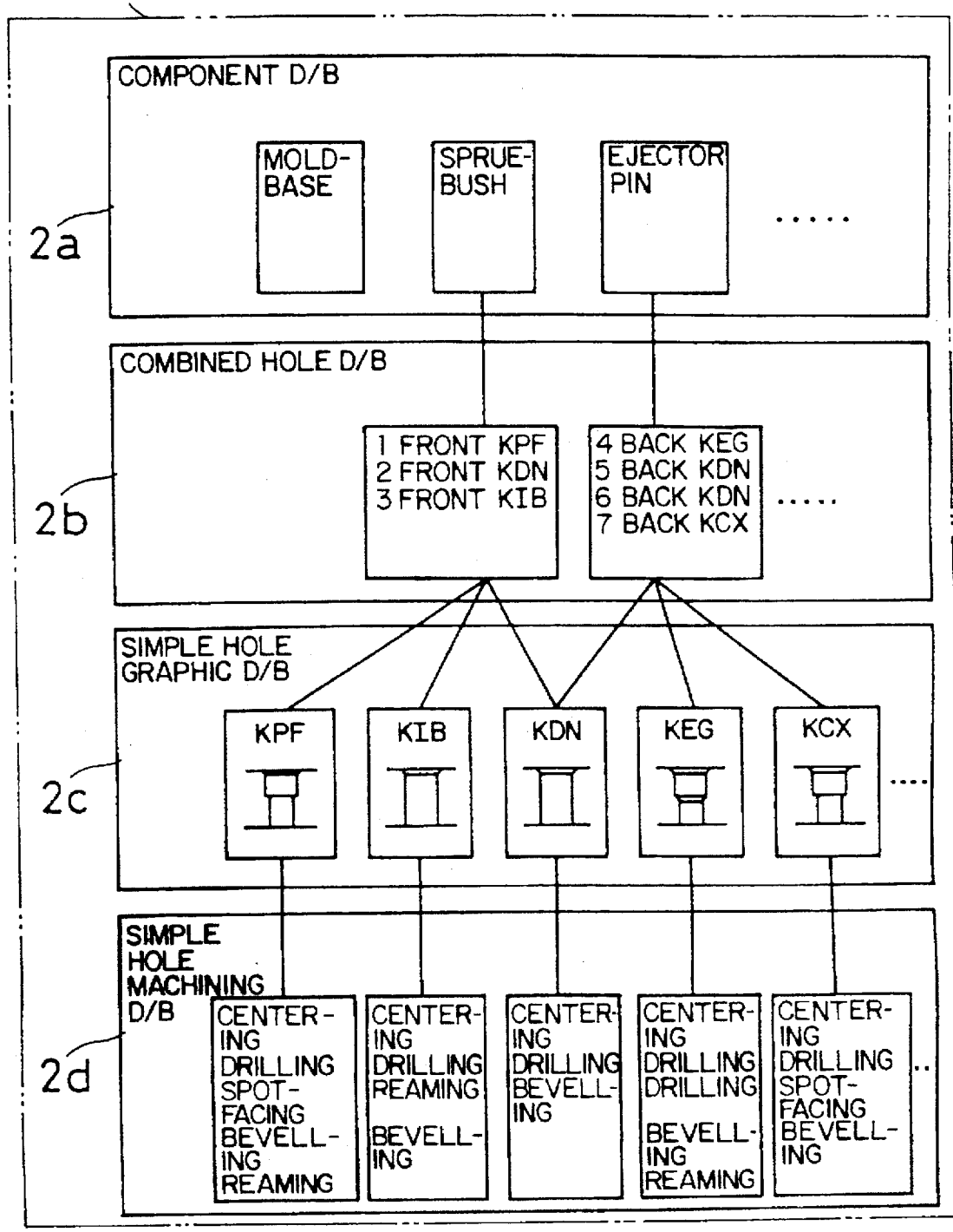
FIG. 16 is a conceptual drawing showing a component data base of a conventional CAD device for metal molds.
Figure 17:
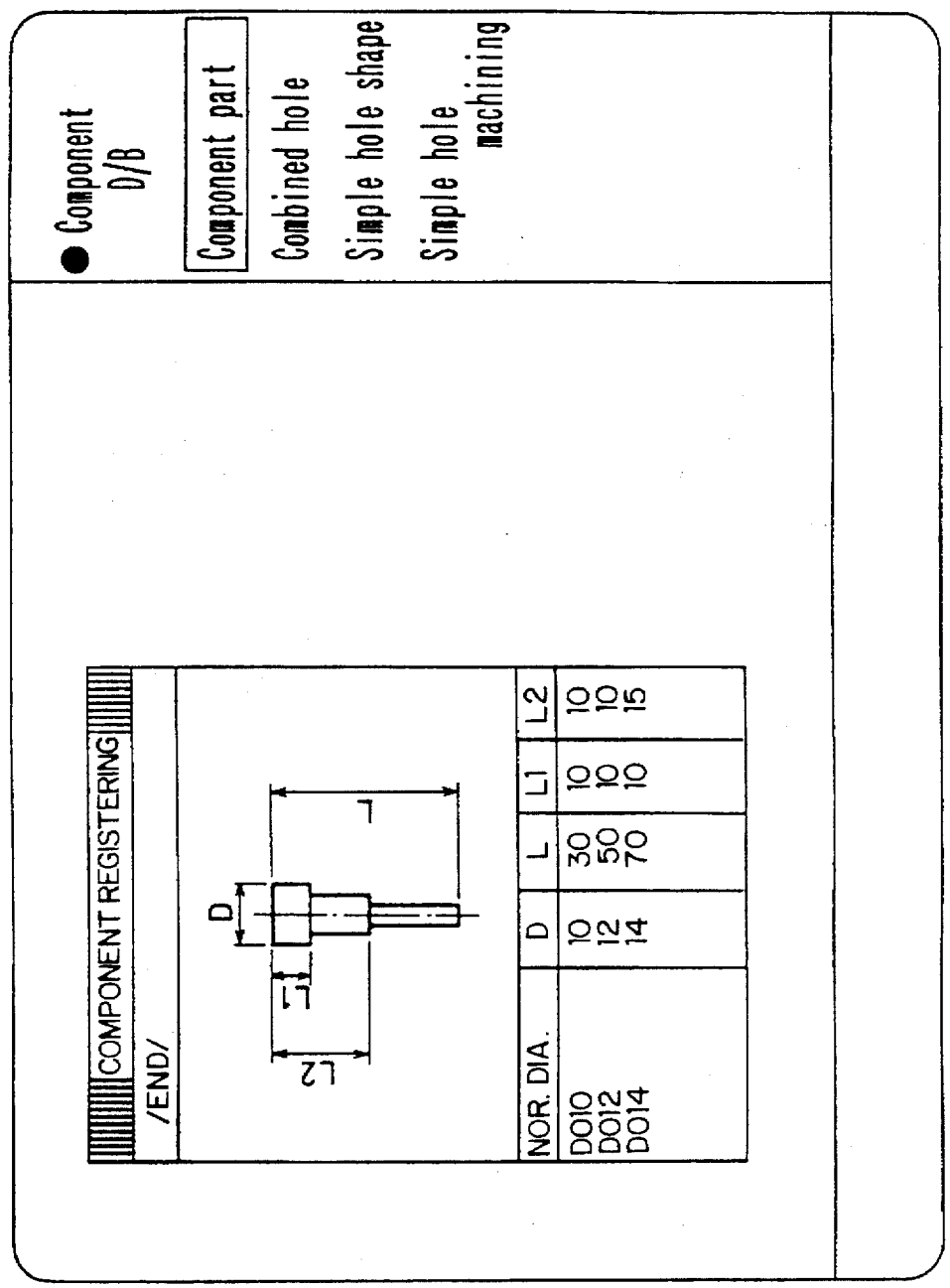
FIG. 17 is an explanatory drawing showing a screen for registering component parts of the component data base of the conventional CAD device for metal molds.

Last of all, an improvement in a combination of components and an overlapping definition of holes is described. The conventional device defines one kind of mounting hole for one kind of component part. Therefore, for example, a component part mounting hole for a pin shown in FIG. 13a (pin mounting hole) and a component part mounting hole for a bush shown in FIG. 13b (bush mounting hole) are separately defined. However, in case of using these in combination, as shown in FIG. 13c, there is made up a plate on which a plurality of holes are overlapped about the same coordinate. Namely, hole machining for two mounting holes or the pin mounting hole and the bush mounting hole are specified for the plate A, so that the pin mounting hole smaller than the bush mounting hole is also an object of a hole machining. In this case, the pin mounting hole that needs no hole machining is also to be machined, so that it is necessary to delete unnecessary holes before generating the NC data. However, the more the number of component parts and their combinations are, the more difficult such a work is.

In order to solve this problem, there can be proposed a method to register in advance a combination of the pin and the bush as one component part. However, plural sorts of pins and plural sorts of bushes can usually be combined, so that the number of the combined component parts becomes the number multiplying them. Namely, in case of combining a plurality of component parts, a large number of combinations of the component parts are necessary, so that the registering operation of the component data base is troublesome, and it cannot be said best.

In view of the above, the present embodiment of the device solves the above problem by improving the NC data generating command 4f constituting the NC data generating means. An internal process is added to the component data base registering command 4c, namely, in case two or more holes are defined on the same coordinate, the diameters are compared with each other and only a hole of the largest diameter is made an object for registration and the other holes are ignored. For example, as shown in FIG. 13c, if the pin mounting hole is φ12 and the bush mounting hole is φ16, a hole machining for the pin mounting hole of φ12 is ignored. With this process, the operator can mount the component parts without any regard to particularly overlapping of the holes. Moreover, it is enough to register each component alone in the component data base 2a, and it is unnecessary to pay attention to their combination.

FIG. 14 is a flowchart showing an internal processing of an NC data generation.

According to the procedures of the flowchart of FIG. 14, first of all, in a step S501, an operator inputs a plate number or a molding piece number for which NC data is generated. Execution proceeds to a step S502 which reads out a setting of a material of the plate or the molding piece. Proceeding to a next step S503, one hole is selected from a currently edited drawing. Execution proceeds to a step S504 which decides if the selected hole is a hole of the plate number or the molding piece number for which the NC data is being generated or not. If this hole is not the hole of the plate for which the NC data are generated, execution proceeds to a step S510. If this hole is not the hole of the plate for which the NC data are generated, execution proceeds to a step S505. The step S505 checks whether this hole is contained in another hole or not. If the hole is contained in another hole in the step S506, execution proceeds to the below mentioned step S510. If the hole is not contained in another hole and needs to be machined, execution proceeds to a step S507 which reads out data for machining the hole from the simple hole machining data base 2d. Proceeding to a next step S508, a machining condition at this time is corrected in accordance with the material of the plate or the molding piece. Execution proceeds to a step S509, and it is stored after the machining condition of the last hole. Proceeding to the next step S510, the same procedures are repeated until all the holes have been finished with the procedures of the steps S503 to S510. If all the holes have been finished with the procedures, execution proceeds to a step S511. The step S511 sorts the machining condition which has been provisionally stored after the machining condition of the last hole, so as to determine a machining order. With this procedure, machining steps for prepared holes may be gathered in the first half of the machining, or such steps as use the same tool may be carried out in parallel or collectively, thereby decreasing tool changes. Execution proceeds to a step S512, and an NC data file is opened or prepared. Proceeding to a step S513, the NC data of the plate or the molding piece of the number "n" are generated according to the sorted machining order. Execution proceeds to a step S514, and the same procedures are repeated until all the holes have been finished with the procedures of the steps S513–S514. If all the holes have been finished with the procedures, execution proceeds to a step S515. In the step S515, the NC data file is closed and the present flowchart is ended.

As mentioned above, in the present embodiment of the CAD device for metal molds, the NC data generating means constituted by the NC data generating command 4f may be practised in an embodiment that generates NC data for the hole machining after selecting a mounting hole of the largest diameter among the holes when two or more mounting holes for mounting two or more component parts are defined at the same coordinate.

Accordingly, if two or more mounting holes are defined at the same coordinate, the largest diameter of the mounting hole among them is selected and NC data for the hole machining are generated by the NC data generating means.

As a result, even if two or more component parts are mounted on the same coordinate and the mounting holes are overlapped, it is possible to obtain NC data for the hole machining without any loss.

As described above, according to the CAD device of the present invention, the graphic defining unit designates to which a graphic to be prepared belongs among plates and molding pieces that are plurally piled up to form the metal mold, and adds necessary data thereto and represents it on a drawing of the metal mold. The input condition setting unit sets a predetermined condition including mutual data in the plates and the molding pieces. The component data base registering unit registers graphic data of component parts mounted on the metal mold and machining data of mounting holes, as desired. The component mounting unit designates a mounting position of the component part on the drawing of the metal mold. The separated drawing preparing unit separates a finished drawing of the metal mold into each plate and each molding piece and prepares a drawing of the plate and a drawing of the molding piece. Thus, drawings can be prepared for a cavity, a core, a slider, or the like called the molding piece which is a metal mold component part and needs to be machined with mounting holes for other component parts in itself, in addition to the plates that constitute the metal mold, and it can be treated like the common plate, by making it possible to register data of a relative positional relationship to other plates or a thickness.

Further, according to the CAD device of the present invention, if a change is made with respect to whether each plate or each molding piece is disposed uppermost or hidden under other plates or molding pieces in the drawing, it is possible to automate and omit operations for changing the displayed state of each hole which is defined and exists on the plate or the molding piece, namely, changing the solid line and the broken line.

Further, according to the CAD device of the present invention, in case a change is made with respect to whether each plate or each molding piece is disposed with the fixed side upward or the moving side upward in the drawing, when preparing the parted drawing, it is possible to automate and omit operations for changing the displayed state of each hole which is defined and exists on the plate or the molding piece, namely, changing the solid line and the broken line.

Further, according to the CAD device of the present invention, it is enough to input only the plate or the molding piece in accordance with the metal mold structure to be designed in the plate setting or the molding piece setting, and it is possible to prevent unnecessary holes from being produced for nonused plates or molding pieces.

Further, according to the CAD device of the present invention, it is possible to set materials of the plates and the molding pieces, change a machining condition of the mounting hole in accordance with the materials of the plates and the molding pieces, and make them corresponding to the change of the material of the plate or the molding piece.

Also, according to the CAD device of the present invention, even if one plate or molding piece needs to be machined simultaneously from the front side and the back side, the registration is possible as the registration of one of the front side and the back side for machining.

Also, according to the CAD/CAM device of the present invention, even if two or more component parts are mounted on the same coordinate and the mounting holes are overlapped by the NC data generating means, it is possible to obtain NC data for the hole machining without loss.

What is claimed is:

1. A CAD device for designing a metal mold, having a plurality of plates and a plurality of molding pieces that are assembled to form the metal mold, and preparing finished drawings therefore, comprising:

graphic defining means for designating to which plate and which molding piece a drawing to be prepared belongs among said plurality of plates and molding pieces and for adding data thereto and representing said data on a drawing of the metal mold;

input condition setting means for setting a predetermined condition, including mutual data for the plates and the molding pieces;

component data base registering means for registering graphic data for at least one component part that is to be mounted on the metal mold and machining data for mounting holes for mounting said at least one component part on the metal mold;

component mounting means for designating on the drawing of the metal mold the mounting position of said at least one component part; and separated drawing preparing means for separating the representation of the drawing of the metal mold according to each plate and each molding piece and for preparing a drawing of at least one of the plurality of plates and a drawing of at least one of the plurality of molding pieces.

2. The CAD device according to claim 1, wherein said input condition setting means is operative to set data for a plate or molding piece as said mutual data, if said plate or molding piece is hidden by another plate or molding piece, and to change a displayed state, that is shown by a solid line or a broken line, of each mounting hole, which is defined and exists on the plate or the molding piece, in accordance with a change of input condition.

3. The CAD device as set forth in claim 2, wherein said input condition setting means further comprises means for preparing a graphic of a newly defined mounting hole in accordance with said input condition.

4. The CAD device according to claim 1, wherein said input condition setting means is operative to set data for a plate or a molding piece as mutual data, if said plate or molding piece is disposed with a fixed side upward or a moving side upward.

5. The CAD device according to claim 1, wherein said input condition setting means is operative to change a displayed state that is shown by a solid line or a broken line of each mounting hole, which is defined and exists on the plate or the molding piece, in accordance with a change of input condition.

6. The CAD device according to claim 5, wherein said input condition setting means further comprises means to prepare a graphic of a newly defined mounting hole in accordance with the input condition.

7. The CAD device according to claim 1, wherein said input condition setting means is operative to define a plate or a molding piece as being out-of-use in said metal mold and for preventing said component mounting means from defining a mounting hole on the plate or the molding piece that is defined as being out-of-use.

8. The CAD device according to claim 1, wherein said input condition setting means is operative to define materials of the plates and the molding pieces, and wherein said component mounting means changes a machining condition of a mounting hole in accordance with the defined materials of the plates and the molding pieces.

9. The CAD device according to claim 1, wherein said component data base registering means registers a combined hole as the mounting hole of the component part for a plurality of plates or molding pieces by combining a plurality of simple hole shapes, said simple hole shapes being data registering shapes and machining data for a hole for one plate or molding piece, and wherein said component data base registering means is operative to simultaneously register a front side and a back side of said combined hole when it is necessary to machine the one plate or molding piece from the front side and the back side.

10. The CAD device according to claim 1, wherein said separated drawing preparing means changes one of said drawing of at least one of the plurality of plates and said drawing of at least one of the plurality of molding pieces based on said predetermined condition set by said input setting means.

11. The CAD device according to claim 1, wherein the plurality of plates and plurality of molding pieces of the metal mold are arranged in a stacked relation.

12. A CAD/CAM device comprising:

a CAD device for designing a metal mold, having a plurality of plates and a plurality of molding pieces that are assembled to form said metal mold, and preparing finished drawings therefor comprising:

graphic defining means for designating to which plate and which molding piece a drawing to be prepared belongs among said plurality of plates and molding pieces, and for adding data thereto and representing the data on a drawing of the metal mold;

input condition setting means for setting a predetermined condition, including mutual data for the plates and the molding pieces;

component data base registering means for registering graphic data for at least one component part that is to be mounted on the metal mold and the machining data for mounting holes;

component mounting means for designating on the drawing of the metal mold the mounting position of said at least one component part;

separated drawing preparing means for separating the representation of the drawing of the metal mold according to each plate and each molding piece and for preparing a drawing of at least one of said plurality of plates and a drawing of at least one of said plurality of molding pieces; and NC data generating means for selecting a hole of a largest diameter and generating NC data for a hole machining when two or more mounting holes are defined for mounting two or more component parts at a same coordinate.

13. The CAD device according to claim 12, wherein said separated drawing preparing means changes of said drawing of at least one of the plurality of plates and said drawing of at least one of the plurality of molding pieces based on said predetermined condition set by said input setting means.

14. The CAD device according to claim 12, wherein the plurality of plates and plurality of molding pieces of the metal mold are arranged in a stacked relation.

15. A method for designing a metal mold, having a plurality of plates and a plurality of molding pieces that are assembled to form said metal mold, and preparing finished drawings therefor, using a CAD device, comprising:

designating to which plate and which molding piece a drawing to be prepared belongs among said plurality of plates and molding pieces, and adding data thereto and representing the data on a drawing of the metal mold;

setting a predetermined condition, including mutual data for the plates and the molding pieces;

registering graphic data for at least one component part that is to be mounted on the metal mold and machining data for mounting holes;

designating on the drawing of the metal mold the mounting position of said at least one component part; and separating the representation of the drawing of the metal mold according to each plate and each molding piece and preparing a drawing of at least one of said plates and a drawing of at least one of said molding pieces.

16. The method according to claim 15, further comprising setting data for a plate or a molding piece as mutual data, if said plate or molding piece is disposed with a fixed side upward or a moving side upward.

17. The method according to claim 15, further comprising defining a plate or a molding piece as being out-of-use in said metal mold and for preventing said step of defining a mounting hole on the plate or the molding piece that is defined as being out-of-use.

18. The method according to claim 15, further comprising defining materials of the plates and the molding pieces, and changing a machining condition of a mounting hole in accordance with the defined materials of the plates and the molding pieces.

19. According to claim 15, further comprising registering a combined hole as the mounting hole of the component part for a plurality of plates or molding pieces by combining a plurality of simple hole shapes, said simple hole shapes being data registering shapes and machining data for a hole for one plate or molding piece, and simultaneously registering a front side and a back side of said combined hole when it is necessary to machine the one plate or molding piece from the front side and the back side.

20. The method according to claim 15, further comprising setting data for a plate or molding piece as said mutual data, if said plate or molding piece is hidden by another plate or molding piece, and changing a displayed state, that is shown by a solid line or a broken line, of each mounting hole, which is defined and exists on the plate or the molding piece, in accordance with a change of input condition.

21. The method as set forth in claim 20, further comprising preparing a graphic of a newly defined mounting hole in accordance with said input condition.

22. The method according to claim 15, further comprising changing one of said drawing of at least one of the plurality of plates and said drawing of at least one of the plurality of molding pieces based on said predetermined condition.

23. The method according to claim 15, wherein said setting a predetermined condition include changing a displayed state that is shown by a solid line or a broken line of each mounting hole, which is defined and exists on the plate or the molding piece, in accordance with a change of input condition.

24. The method according to claim 23, further comprising preparing a graphic of a newly defined mounting hole in accordance with the input condition.

25. The method according to claim 15, wherein the plurality of plates and plurality of molding pieces of the metal mold are arranged in a stacked relation.

* * * * *